US005606374A

United States Patent [19]
Bertram

[11] Patent Number: 5,606,374
[45] Date of Patent: *Feb. 25, 1997

[54] VIDEO RECEIVER DISPLAY OF MENU OVERLAYING VIDEO

[75] Inventor: Randal L. Bertram, Raleigh, N.C.

[73] Assignee: International Business Machines Corporation, Armonk, N.Y.

[*] Notice: The term of this patent shall not extend beyond the expiration date of Pat. No. 5,602,597.

[21] Appl. No.: 455,787

[22] Filed: May 31, 1995

[51] Int. Cl.⁶ .................................................. H04N 5/45
[52] U.S. Cl. .................... 348/565; 348/601; 348/734; 345/114; 345/158
[58] Field of Search ................... 348/734, 906, 348/473, 563, 564, 565, 569, 601, 589; 345/23, 113, 114, 116, 119, 158, 160; H04N 5/45, 5/445

[56] References Cited

U.S. PATENT DOCUMENTS

| | | | |
|---|---|---|---|
| 5,237,417 | 8/1993 | Hayashi et al. | 348/565 |
| 5,367,316 | 11/1994 | Ikezaki | 345/158 |
| 5,434,626 | 7/1995 | Hayashi et al. | 348/569 |
| 5,436,676 | 7/1995 | Pint et al. | 348/906 |

*Primary Examiner*—John K. Peng
*Assistant Examiner*—Jeffrey S. Murrell
*Attorney, Agent, or Firm*—Anthony N. Magistrale; Daniel E. McConnell

[57] ABSTRACT

A video display, which may be a television receiver with associated set top device, an intelligent television receiver, or a personal computer system enabled for television display, has associated therewith a remote control which controls modification of the visual images displayed. By use of the remote control, a human observer may cause a processor controlling the video display to execute a control program formulated in a particularly concise language and controlling the display of menus and the like. Menus are displayed as overlays onto a live motion video image. A display controller and video reception circuitry cooperating for displaying full motion video visual images occupying substantially the entirety of a viewable screen area and a menu display occupying a minor portion of the screen area and overlying the full motion video visual images.

41 Claims, 17 Drawing Sheets

FIG. 1
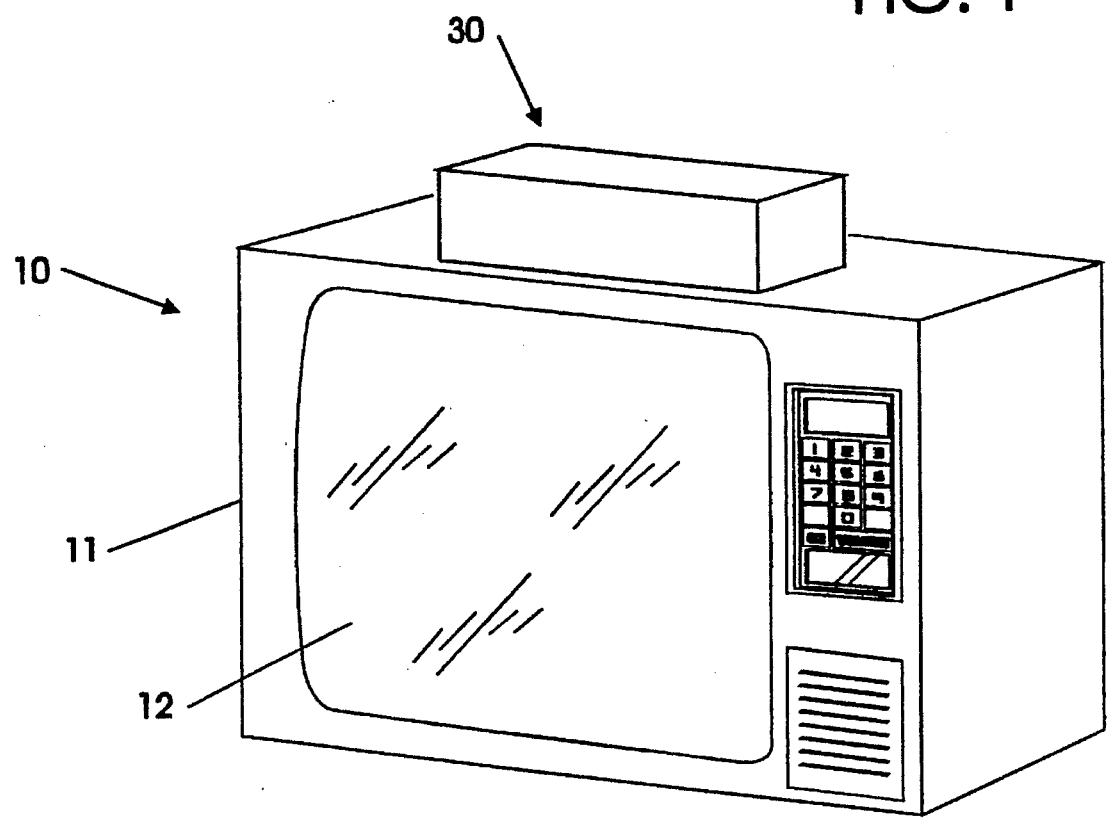
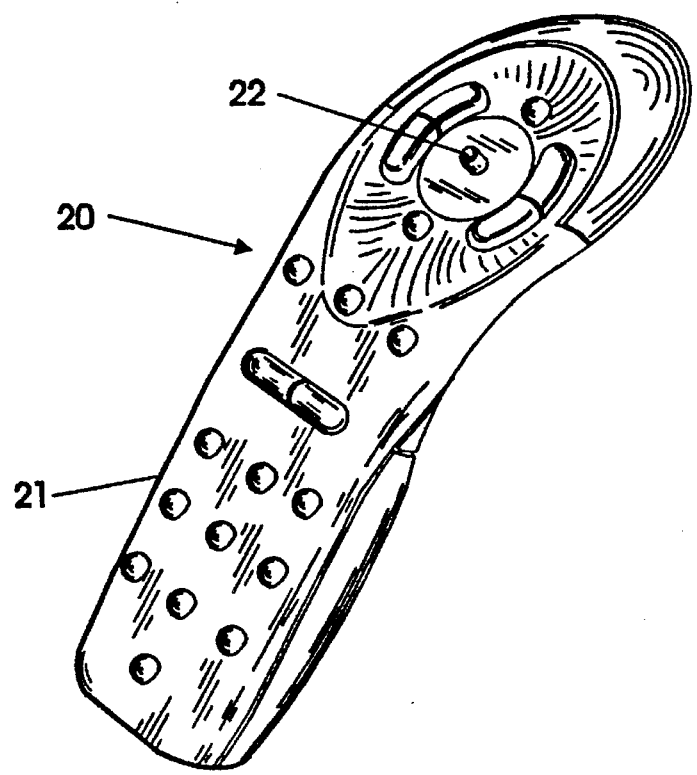

FIG. 6
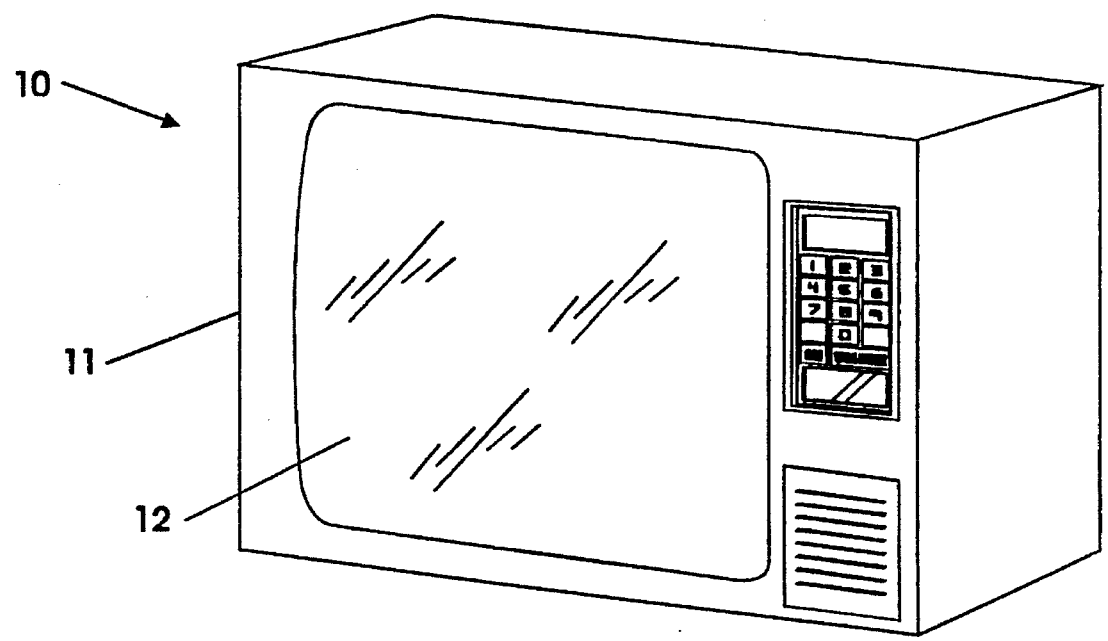
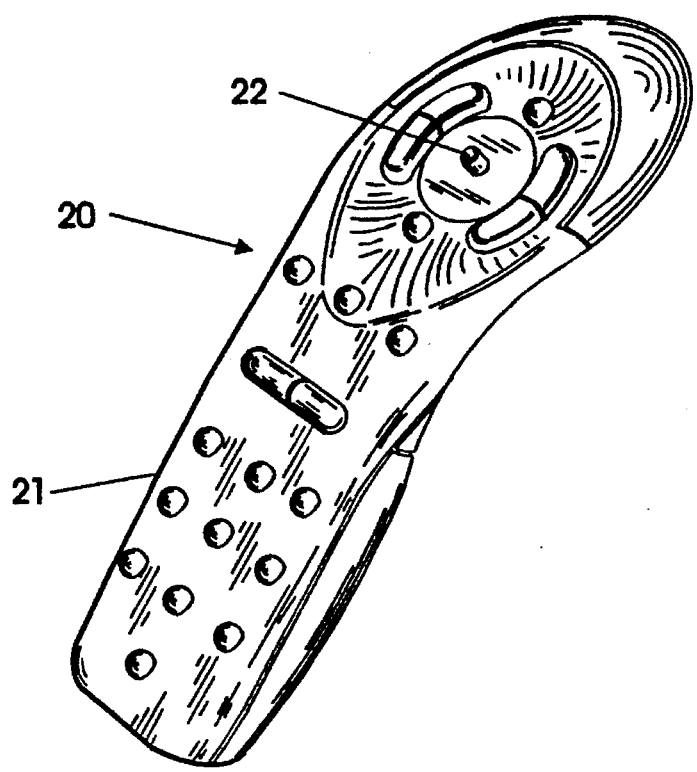

MENU1@CARD I
WEATHER@CARD2
SPORTS@CARD3
@

@CARD2 FLOW
@CARD3
IF 1==1@CARD9
@

MENU2@CARD3
SELECTION A@CARD11
SELECTION B@CARD12
SELECTION C@CARD13
@

VIDEO RECEIVER DISPLAY OF MENU OVERLAYING VIDEO

RELATED APPLICATIONS

This application is one of a series of related applications filed on a common day and assigned to a common ownership. The other applications include:

an application entitled "Diversions for Television Viewers" with named inventor R. L. Bertram, filed on 31 May 1995 under Ser. No. 08/454,803.

an application entitled "Video Receiver Display and Three Axis Remote Control" with named inventors R. L. Bertram et al. filed on 31 May 1995 under Ser. No. 08/454,763.

an application entitled "Video Receiver Display of Cursor Overlaying Video" with named inventor R. L. Bertram filed on 31 May 1995 under Ser. No. 08/454,799.

an application entitled "Video Receiver Display of Cursor and Menu Overlaying Video" with named inventor R. L. Bertram filed on 31 May 1995 under Ser. No. 08/454,806.

an application entitled "Video Receiver Display of Video Overlaying Menu" with named inventor R. L. Bertram filed on 31 May 1995 under Ser. No. 08/454,780; and an application entitled "Video Receiver Display, Three Axis Remote Control, and Microcontroller for Executing Programs" with named inventors R. L. Bertram et al. filed on 31 May 1995 under Ser. No. 08/454,801.

BACKGROUND OF THE INVENTION

This invention relates to consumer use of what is here called the "television space". That is, the use of video/audio signal streams such as in the past have been distributed by broadcast over radio frequency bands or by cable distribution, or made available from video recorder/player devices such as cassette recorders or video disc player, or made available from direct, live sources such as cameras, game systems or computers. Such video/audio signal streams, whether carrying analog or digitally encoded information, have come to represent a significant resource to most consumers for information and entertainment.

Access to the television space has, in the past, been achieved by use of a television receiver. Then came changes in the methods of distribution, leading to the use of various set top devices such as cable boxes for analog signal streams, recorder/players, game machines, home cameras, etc. As such devices using the television space have proliferated, so also have the associated control devices. As television space technology has approached what is presently known as the "home theater", systems having as many as seven or more constituent components which are connected one to another have become possible. In such systems of systems, several or even all of the constituent systems may have its own remote control device, intended to enable a human observer to control the functionality of the respective constituent system while avoiding the necessity of directly manipulating control available at the face of the system. With the proliferation of systems, a user is frequently faced with a proliferation of remote control devices.

At the same time as remote controls have been proliferating, attempt to provide a "universal" remote have been made. Such attempts have resulted in remote controls having a manual interface, usually in the form of buttons, which approaches or exceeds the limits of human usefulness. By way of example, there are remote control devices offered with certain of the component systems for home theater use which may have fifty or so separate (and separately or jointly operable) buttons.

Such a proliferation of controls and proliferation of control functions results in an unmanageable situation for a consumer. Coordinating control among a plurality of remote control devices and system elements becomes quickly difficult to the point of impossibility. Further, the user interfaces easily become confused. It becomes difficult for a human observer to be certain of the response which may be achieved by selecting and actuating a particular button on a particular remote control.

The present invention proposes that these difficulties be resolved by providing, for the television space and for other environments presenting similar problems of resource allocation and navigation, a single remote control device which cooperates with a display controller and with control programs executed by the display controller and an associated central processing unit (CPU). The remote control device, in accordance with this invention, has access to the resources of the entire system with which it is related. Further, the navigation among-functions available and resource allocation is accomplished by display of on-screen images which overlay or modify the images derived from the video/audio streams entering the television space. This is accomplished with minimal buttons to be actuated by the human observer.

SUMMARY OF THE INVENTION

With the above discussion in mind, it is one purpose of this invention to assist a human observer of programming made available in the television space, or similar displays found elsewhere, in making selections of services or functions to be accessed through the system displaying the visual images so derived. In accomplishing this purpose, the present invention overlays onto a video display a menu of operations and services selectable by a cursor which is controlled by a remote control device made available to the user. The menu displays enable a user to position the cursor to access control features of the system displaying the images, and to select certain control features for utilization.

BRIEF DESCRIPTION OF THE DRAWINGS

Some of the purposes of the invention having been stated, others will appear as the description proceeds, when taken in connection with the accompanying drawings, in which:

FIG. 1 is a perspective view of one embodiment of the present invention which includes a television receiver, a set top device, and a remote control;

FIG. 6 is a perspective view of another embodiment of the present invention which includes a television receiver and a remote control;

DESCRIPTION OF THE PREFERRED EMBODIMENT(S)

Figure 2:
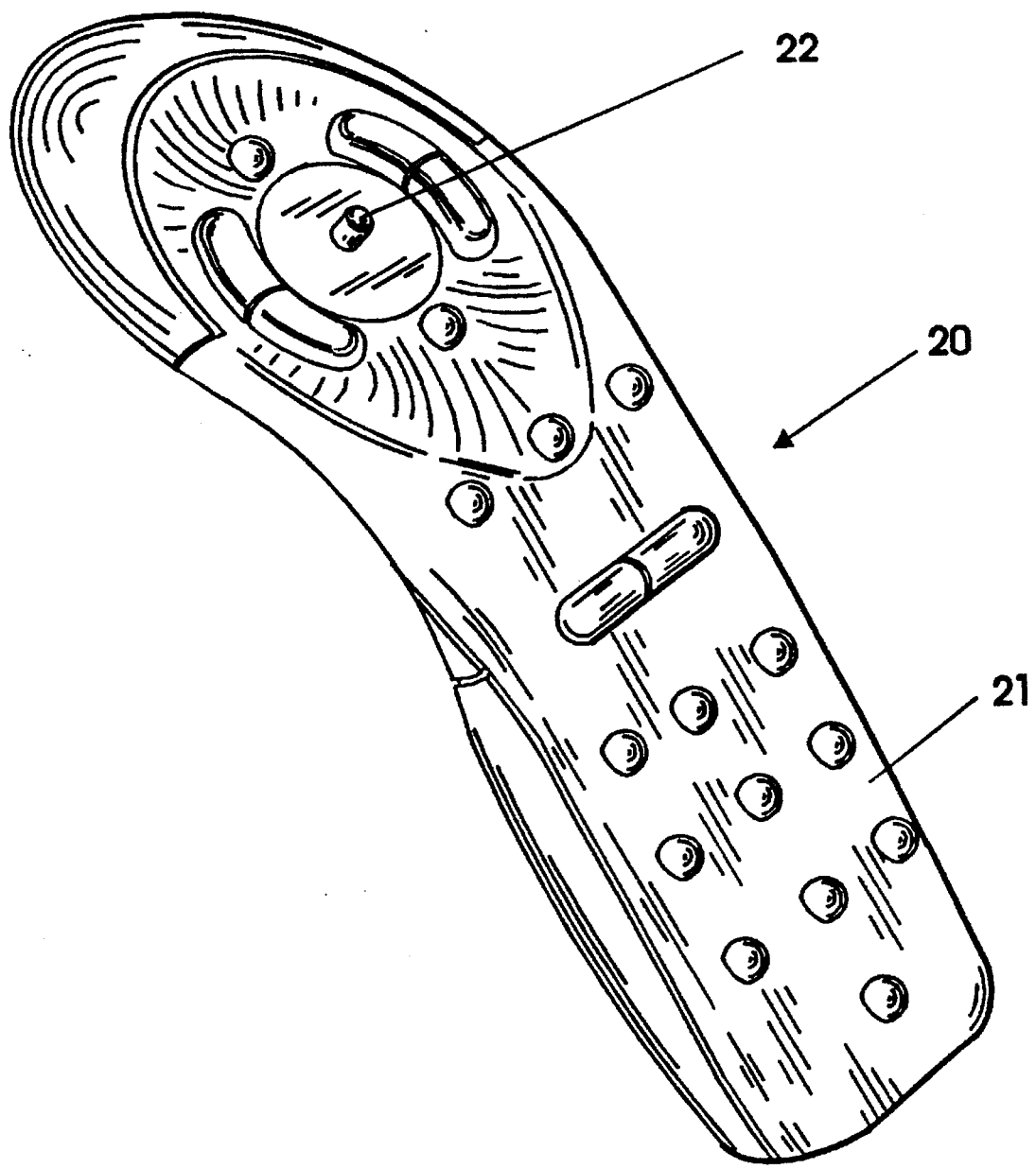
FIG. 2 is an enlarged perspective view of the remote control of FIG. 1.

While the present invention will be described more fully hereinafter with reference to the accompanying drawings, in which preferred embodiments of the present invention are shown, it is to be understood at the outset of the description which follows that persons of skill in the appropriate arts may modify the inventions here described while still achieving the favorable results of these inventions. Accordingly, the description which follows is to be understood as being a broad, teaching disclosure directed to persons of skill in the appropriate arts, and not as limiting upon the present inventions.

Before undertaking a detailed description of specific embodiments of the present inventions, it is believed useful to set forth some description of the environments in which the inventions find utility.

In more expansive forms, the inventions are practiced using systems which have a video display device, circuitry for driving a display of visual images by the video display device, a display controller, and a remote control. In simplest form, the present inventions may be practiced through the use of a remote control device and a display controller.

Video display devices useful in the practice of the inventions here described are contemplated as including glass envelope cathode ray tubes (CRTs) such as are conventionally used in consumer electronics systems such as television receivers and in personal computer systems, television projectors such as are used in large audience displays, liquid crystal displays (LCDs) similarly used, gas plasma displays, and other flat panel displays. The listed types of devices are given as examples only, as it is contemplated that the types of displays with which these inventions are useful will extend to include still other types of display devices either not in common use or unknown at the time of writing this description, yet capable of displaying visual images to a human observer in a manner similar to the displays presented by the listed devices.

In any instance, the display will be coupled to circuitry capable of delivering to the video display device video signals which drive the video display device to display such visual images. Such circuitry may include analog or digital tuners for receiving video signal streams transmitted or distributed at frequencies which are outside direct sensing by the human observer and which carry data which is to generate, after appropriate processing, the visual displays. Specific examples of such circuitry will be given hereinafter. However, it is contemplated that the circuitry may include that typically found in a set top device used as an accessory to a television receiver, in a television receiver, in a personal computer system, or in other types of consumer electronic systems.

Video signal streams delivered to and through such circuitry may have a variety of characteristics. The streams may be of compressed signals, in which some information has been condensed or compressed by processing to facilitate transmission or storage. One set of such compression technologies are those specified by the Motion Picture Engineering Group (MPEG). In such event, the circuitry may include provision for decompression of the video signal stream. The streams may be of uncompressed signals. The streams may be of analog information, such as conventional NTSC or PAL broadcast television quality, or of digital information derived from digitizing analog information or by direct authorship. The streams may be "live" in the sense of being transmitted and received and displayed concurrently with the occurrence of the events depicted, or recorded. Distribution of the signals may be by broadcast or by some broadband distribution method such as cable, optical fiber or the like.

In all embodiments of these inventions to be here described, the video signal streams are delivered to the video display device under the control of a display controller. The display controller, as described more fully hereinafter, may be found in a number of different environments, now to be described.

One such environment is provided by set top devices which, as contemplated by this invention, may be in the form of cable tuner systems, such as are used in many homes to which video streams are delivered by cable distribution networks. Set top devices may have the capability of decoding satellite transmissions, or video signal streams distributed in digital form, with or without encryption. They may also be in the form of devices which include record/playback capability, such as VHS tape or videodisc. They may also be in the form known as game machines, of which the systems offered by Nintendo and Sega are perhaps the best known. They may include back channel capability, so as to return a signal to a distribution system, either directly over a distribution link or through an alternate channel such as a conventional telephone line. A set top device may include some of all of the capabilities of the systems briefly mentioned above, as well as others perhaps not here set out in such detail.

One such set top device is illustrated more specifically in FIG. 1, where are shown a television receiver 10, a remote control 20, and a set top device 30.

The television receiver 10 is preferably a device of the type available to any consumer from any supplier of television receivers, and will have a housing or cabinet 11 within which is arranged a video display device 12. As described hereinabove, the display device 12 may take any one of a number of forms. Also housed within the housing or cabinet 11 is video reception circuitry (not shown in FIG. 1) which is coupled to the video display device for receiving signals transmitted at frequencies which are outside direct sensing by a human observer and for delivering to the video display device video signals which drive the video display device to display visual images perceivable by the human observer. The television receiver may be one configured to receive broadcast signals of NTSC or PAL standards or a "cable ready" receiver which implements a design capable of directly receiving a larger number of channels of analog signals such as may be distributed by a cable service provider. The television receiver may be one configured to receive a digital data stream, although at the time of writing of this disclosure such sets are not readily available commercially as a consumer product. Details of circuitry for such receivers may be found in any of a number of industry reference texts.

The video reception circuitry is contemplated as being capable of receiving signals which carry analog information defining visual images to be displayed; digitally coded information defining such visual images; or compressed digitally coded information defining such visual images. Such signals as contemplated as being transmitted by broadcast transmission or by cable transmission or by satellite transmission or by transmission through a telecommunications network.

One form of remote control is shown in FIGS. 1 and 2 at 20. Preferably, the control 20 is a three axis remote control device usable at some distance of separation from the television receiver 10. The meaning of the phrase "three axis" will become more clear from discussion which follows later in this description. The control 20 has a housing 21 sized to be held in the hand of a human observer of the images displayed on the display device. The housing, while shown to be of a configuration particularly intended to lie comfortably in the hand of a user, may taken any configuration which is reasonably held. The control 20 also has a manually engageable input device 22 mounted in the housing 21 for manipulation by the human observer and control transmitter circuitry (not visible in FIG. 2) mounted in the housing and coupled to the input device 22 for transmitting at a frequency which is outside direct sensing by the human observer command signals coordinated in a predetermined manner to manipulation of the input device 22 by the human observer. Such circuitry, while not shown, may be as used in other more conventional hand held remote control devices such as are widely used by consumer electronic systems such as television receivers and audio systems. As such, the circuitry may follow the teachings of manufacturers of such devices.

The "three axis" characteristic of the input device can also be known as a "press to select" characteristic. Stated differently (and as will become more clear as this description proceeds), the input device may be manipulated from side to side, toward and away from the user'as hand, and toward any point around a circle centered on the device 22. If such actions were considered as if oriented to a compass rose, side to side motion might be toward and away from East and West, while motion toward and away from the user's hand might be toward and away from North and South. In this analysis, the device 22 is capable of indicating movement toward any point of the three hundred sixty degrees of the compass.

When so manipulated, the input device 22 will generate signals which, in the contemplation of this invention, will ultimately give effect to movement of a cursor or pointer display element (illustrated at 135 in FIGS. 13 through 18) across the field of view provided by the display device 12. Once such manipulation has positioned the pointer over an appropriate portion of the visual images displayed (as will become more clear from discussion which follows), then an action indicated by such an element may be selected by pressing on the input device 22. Thus movement to points of the compass rose (as discussed above) is movement on two axes, while pressing on the input device 22 is movement along a third axis. It is the two axis movement for pointer positioning and third axis movement for action selection which gives rise to the terminology "three axis" remote control device.

The input device 22, while shown in one form, may take a variety of forms. In particular, the device 22 is shown as what is here called a "wiggle stick". A wiggle stick, in the contemplation of this invention, is an elongate member pivoted within the housing 21 of the remote control 20 and protruding therefrom. By suitable sensors, which may be strain gauge type devices or other electromechanical sensors, pressure exerted on the wiggle stick or physical movement thereof are transduced into electrical signals indicating manipulation by the human observer. Alternate forms of the input device 22 may be a wobble plate (similar to the device found on commercially available game controllers used with game machines accessories for television receivers), a trackball, a mouse, or an inertial mouse. The latter two forms of devices differ in that a mouse, as conventionally used with personal computer systems, rests upon a surface over which it is moved by a user to generate signals effecting movement of a cursor or pointer display element across the field of view provided by a display device while an inertial mouse references to a self contained inertial platform and may be manipulated free of a surface, as in the air. Such a device is also known as an air mouse.

The remote control device 20 is coupled to the display controller (discussed in greater detail later in this description) in one of a variety of manners. In the form illustrated in FIGS. 1 through 6, the input device 20 is coupled by command transmitter circuitry mounted in the housing 21 and coupled to the input device 22 for transmitting at a frequency which is outside direct sensing by the human observer command signals coordinated in a predetermined manner to manipulation of the input device by the human observer. Such command signals, as is known to persons of skill in the arts related to other pointer control devices, may be emitted by an infrared radiation emitter, a radio frequency emitter, or an ultrasonic emitter. In other forms, described hereinafter in connection with the personal computer system of FIGS. 7 through 9, command signals may be transferred through an elongate flexible conductor.

Figure 3:
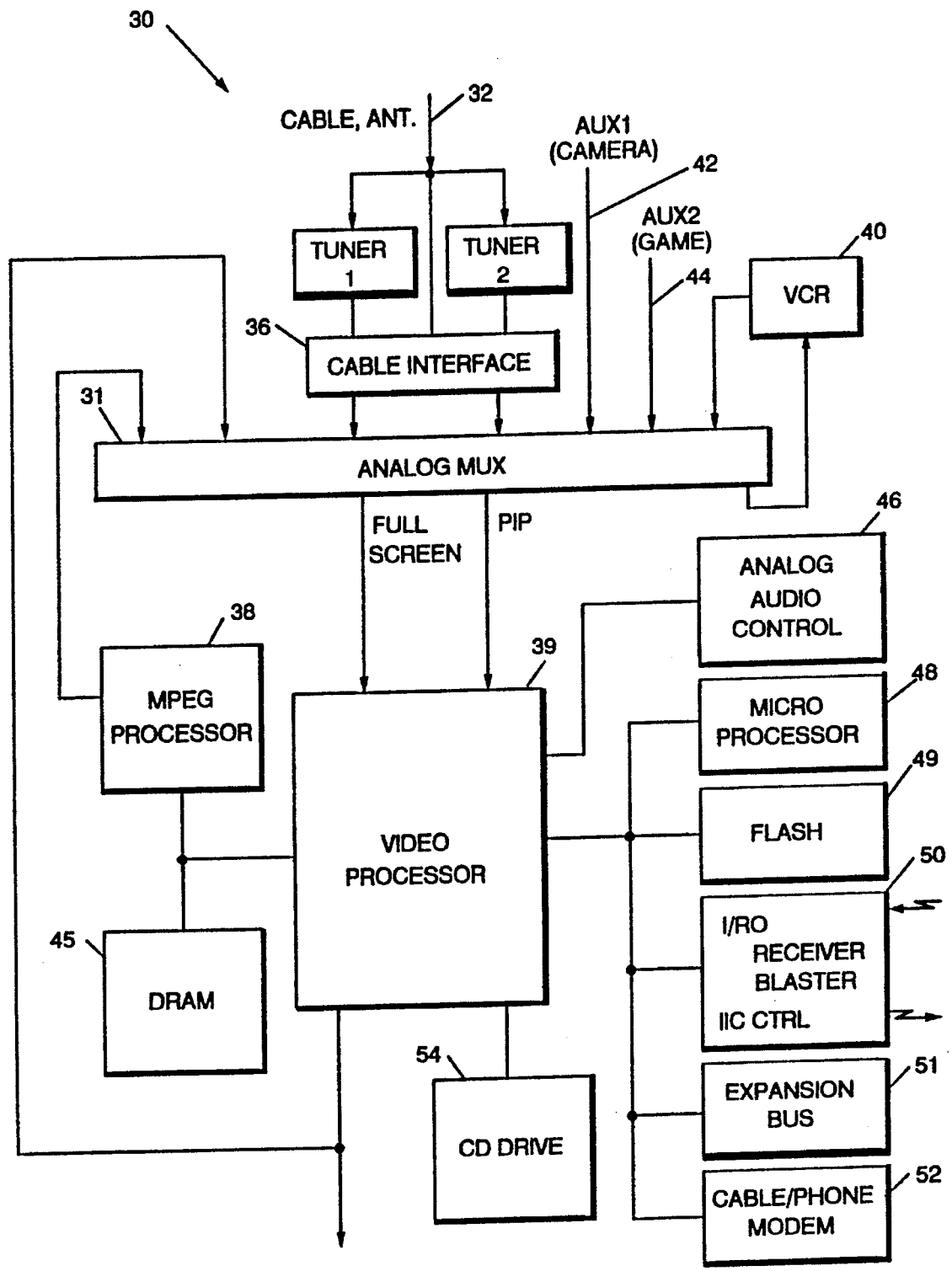
FIG. 3 is a schematic block diagram view of certain elements of the set top device of FIG. 1.

One form of set top device 30 is more particularly shown in FIGS. 3 through 5 and will be described in some detail with reference to those Figures. However, it is to be recognized that the particular device here described is only one of a number of varieties of such devices as alluded to hereinabove. The illustrated embodiment preferably has an analog multiplexer 31 through which many of the signals flow among elements of the device 30 as illustrated in FIG. 3. Signals reaching the analog multiplexer 31 can arrive from an antenna or cable connection 32 through first or second tuners 34, 35 or a cable interface 36. The cable interface may allow for decryption of securely encoded signal streams, either on a single use ("Pay per view") or timed interval (subscription) basis. The analog multiplexer 31 also serves as a conduit for signal streams from the output of an MPEG processor 38, the video processor 39, a video recording/playback device 40 such as a VHS video cassette recorder/player or a videodisc player, and auxiliary devices such as a camera (not shown) through a camera auxiliary port 42 or a game machine (not shown) through a game auxiliary port 44.

The video processor 39 is a central element of the set top device. In addition to the elements recited above, the processor 39 is operatively connected with system memory 45, an analog audio control 46, a microprocessor 48 functioning as a central processing unit or CPU, flash memory 49, an I/O processor 50 including an infrared receiver/blaster, an expansion bus 51, a cable or telephone modem 52, and a Compact Disk (or CD) drive 54. Each of these elements serves functions to be described more fully hereinafter.

The video processor 39 will be discussed in detail in the text addressing FIG. 5. Suffice it to say for now that the video processor 39 comprises the following functional blocks: a memory refresher, a video controller, a blitter graphical coprocessor, a CD drive controller, a digital signal processor (DSP) sound coprocessor, and an arbitrator to arbitrate the access to the system memory between the six possible bus masters (the CPU, the blitter, the DSP, the memory refresher, the video controller, and the CD drive controller). The arbitrator controls the changing priorities of the devices, as described herein, and is in electrical circuit communication with all the devices within the video processor 39. For example, the CPU 48 has the lowest priority of all bus masters until an interrupt occurs. Thus, the arbitrator is in circuit communication with both an interface to the CPU and an interrupt controller.

The CPU 48 has a SYSTEM bus associated with it. The SYSTEM bus includes a DATA bus, ADDRESS bus, and CONTROL bus. The video processor 39 is the arbitrator for the system memory 45; therefore, the SYSTEM bus is modified to a SYSTEM' bus (comprising a DATA' bus, ADDRESS' bus, and CONTROL' bus) by the video processor 39.

The system memory 45 comprises screen RAM, system RAM, and bootstrap ROM. The system memory 45 will be discussed in more detail in the text accompanying FIG. 5.

The I/O processor 50 interfaces the CPU 48 to numerous I/O devices, such as the remote control 20, a keyboard, a digitizer, a printer, or a touchpad. In a preferred embodiment, the I/O processor is a preprogrammed MC608HC705C8 (hereinafter "68HC705"), manufactured by Motorola Corp, running at 2 MHz. The 68HC705 I/O processor is interfaced to the CPU 48 by configuring the 68HC705 as a peripheral device: (1) PA0–PA7 are connected to D0–D7 of the DATA bus; (2) PB7, PB1, and PB2 are connected GPIO1 (a 32-byte address range decoded by the video processor 39), A1, and A2, respectively, of the ADDRESS bus and CONTROL bus; and (3) PB3, PB4, and PB5 are connected to ADS, READY, and W/R, respectively, of the CONTROL bus. Thus, the I/O processor is decoded to have four 16-bit addresses in I/O space (referred to herein as AS0, AS2, AS4, and AS6). The I/O processor also interfaces with appropriate receiver circuitry which is able to detect and receive the signal packets emitted from the remote control 20.

The program inside the 68HC705 interfaces to the CPU 48 as follows. The 68HC705 is designed to attach directly to the processor bus and act as an I/O port to the CPU 48. A pair of internal latches hold data passing between each of the processors until the other is ready to receive it. Status bits to each processor indicate the condition of the data latches. Each can tell if the previous data has been read and if any new data is waiting to be read by checking the status bits.

The I/O processor 50 implements the following functions: (1) a 50 ms timer, (2) a serial controller link for input devices, (3) a system reset, and (4) a data/strobe/acknowledge (DSA) CD control communications link for the CD drive 54.

The 50 ms timer is implemented using the watchdog timer of the 68HG705 I/O processor. When the watchdog timer expires, the I/O processor interrupts the GPU 48 using analog interrupt 1 (AI1) of the video processor 39. The GPU 48 responds to this by reading the 16-bit I/O port AS0, described above, which causes the video processor 48 to activate the I/O processor, thereby causing a data transfer between the CPU 48 and the I/O processor.

Input devices are connected to the I/O processor 50 via a serial controller link and controllers. The controllers transform the signalled movements of control devices into a format suitable for transmission along the serial link. The controllers send data packets via the controller serial data link to the system unit. The data packets differ depending on the type of IO device. Go-ordinate type devices (such as those with which the present invention is particularly concerned including a wiggle stick, wobble plate, mouse, joystick, etc.) have a different data packet then a switch closure type of device (keyboard, digital joystick, switch pad, etc). The controllers will include receivers appropriate to any signals emitted by a remote control device 20, such as infrared receivers, radio receivers, etc.

The serial controller link consists of three (3) lines: a data receive line, a VCC (+5 VDC) line, and a ground line. The 68HC705 implements the data receive line of the controller serial link using the PD0/RDI pin. This pin is designed to be used as an interface to serial devices using the well known asynchronous format. A clocked synchronous format could be used in the alternative.

As alluded to hereinabove, the CPU 48 generates multiple buses: a DATA bus, ADDRESS bus, and CONTROL bus, as are well known in the art. These three buses are collectively referred to as the SYSTEM bus. In the preferred embodiment, the CPU 48 is an 80376, manufactured by Intel Corp., 3065 Bowers Ave., Santa Clara, Calif., 95051. The 80376 is a variation of the well known 80386SX, which is well known in the art and also available from Intel Corp. The 80376 differs from the 80386SX in that the 80376 starts up in 32-bit mode, rather than 16-bit mode. Specifically, the CR0 register is forced to a 0011H (0011 in hexadecimal notation) state with bit 0 forced to a logical ONE, effectively making the 376 operate in a 32-bit memory mode. Paging is enabled to allow virtual 386 operation.

The present inventions contemplate that the CPU may access control programs stored, for example, in the set top device system memory 45 so as to be accessible to the processor, for controlling the display of visual images by said video display device. As will be understood by persons of skill in the design of program controlled digital devices, the processor accessing such a control program will be capable of loading the control program and operating under the control of the control program so as to accomplish the functions established by the author of the program. Such a control program may, for example in this disclosure, cause the command receiver circuitry associated with or embedded in the I/O processor 50 which receives command signals from the command transmitter circuitry of the remote control 20 to derive from the received command signals image directing signals directing modification of visual images displayed on the display device. Further, the control program will cause command processor circuitry in the video processor 39 which is coupled to the command receiver circuitry and to the video reception circuitry in the television receiver 10 to receive the image directing signals and modify the visual images displayed on the device 12 as directed by manipulation of the remote control by a human observer.

In executing control programs, the systems here described will receive and store and deliver digitally encoded data in memory devices and execute in a microprocessor coupled to the memory devices digitally encoded control programs stored in the memory devices. The control programs will be effective on execution by the microprocessor for modifying video signals in predetermined manners in response to predetermined image directing signals derived from manipulation of the remote control 20. Such execution of a control program will include controlling microprocessor access to operational resources of the television video display device by execution of an operating system program and/or controlling modification of the video signals by execution of an application program. That is, the control exercised is based upon both operating system allocation of resource access and application program utilization of accessed resources.

Figure 4:
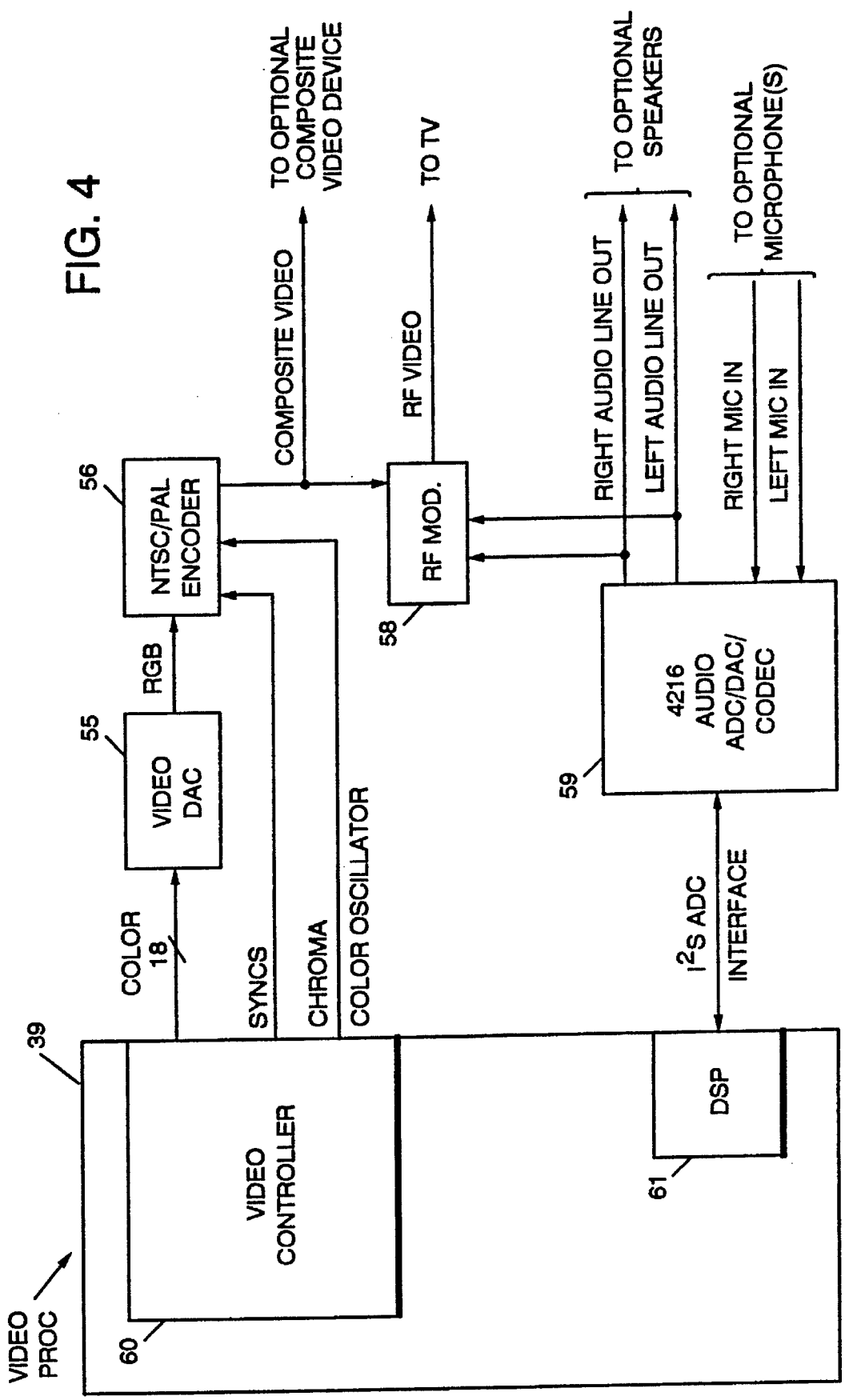
FIG. 4 is a schematic block diagram view of certain elements of the set top device of FIGS. 1 and 3.

Additional circuitry associated with the set top device 30 is shown in FIG. 4. Referring now to FIG. 4, the additional circuitry comprises four devices: a video digital-to-analog converter (video DAC) 55, an NTSC/PAL ("PAL" referring to the well known European television signal standard) encoder 56, an RF modulator 58, and an audio analog-to-digital converter/digital-to-analog converter/compressor/decompressor (ADC/DAC/CODEC) 59.

Figure 5:
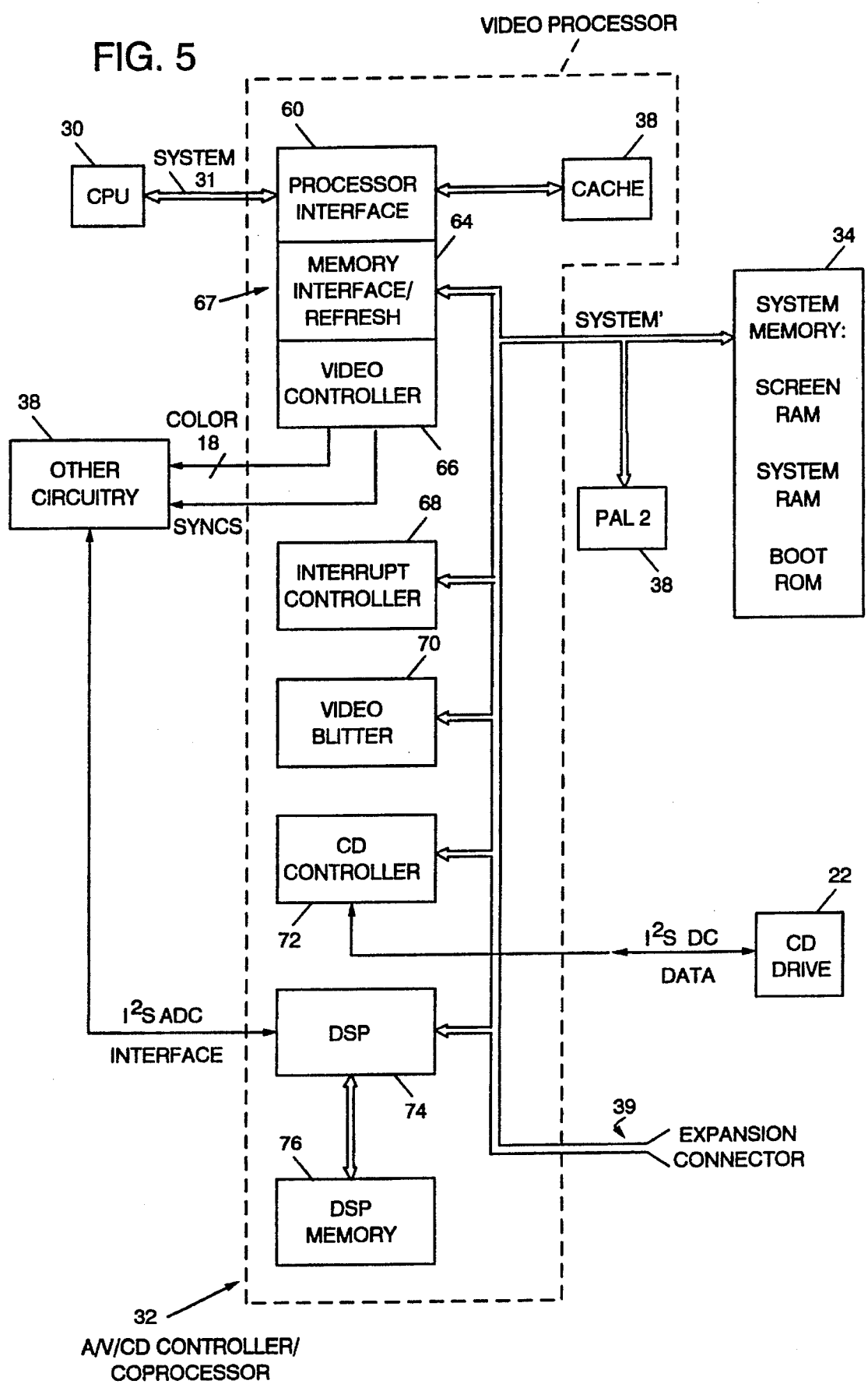
FIG. 5 is a schematic block diagram view of certain elements of the set top device of FIGS. 1, 3 and 4.

The video processor 39 has a number of functional blocks that will be more fully described in the text accompanying FIG. 5. It is sufficient for this point in the description to note that two such blocks are a video controller 60 and a digital signal processor (DSP) 61.

The video controller 60 of the video processor 39 connects to the external video DAC 55, which converts eighteen bits of pixel information (six bits each of red, green, and blue) from the video controller 60 into an RGB signal, as is well known in the art. Each color channel (R, G, and B) of the video DAC is implemented with an R2R resistor tree and a 2N2222 transistor. The RGB signal is converted to NTSC composite video with the NTSC/PAL encoder 62. The NTSC/PAL encoder 62 accepts chroma clock, HSYNC and VSYNC signals which are generated by the video controller 60 of the video processor 39, and red, green, and blue video outputs which are generated by the video DAC 55, and generates a composite video signal in the well known NTSC or baseband video format. In the alternative, the well known PAL (European television signal standard) format can be generated. The composite video signal is connected to an optional external composite video display device with a single female RCA type phono jack, as is well known in the art. In the preferred embodiment, the NTSC/PAL encoder 56 is an MC1377, manufactured by Motorola Corp.

An RF modulator 58 merges the composite video signal from the MC1377 with the left and right audio line out signals from an audio ADC/DAC/CODEC 59 onto a carrier frequency to generate an RF video signal, indicated by RF Video, suitable for being directly input into the television receiver 10. To generate the different PAL (European television signal standard) and NTSC formats a different RF modulator and crystal must be used. The RF video signal is connected to external devices with a single female Type F coaxial connector, as is well known in the art.

The audio ADC/DAC/CODEC 59 is linked to the DSP 61 with a serial link conforming to the well known Philips I²S protocol. The ADC/DAC/CODEC 59 converts analog data to digital data, and vice versa, and compresses and decompresses digital data. The ADC/DAC/CODEC 59 interfaces external stereo analog data from optional microphones to the video processor 39. The audio inputs are connected to external devices with a standard stereo ¼" connector. The audio ADC/DAC/CODEC 59 also interfaces digital data from the video processor to external devices by generating left and right audio line out signals. These signals are connected to external devices, such as optional speakers with two female RCA phone jacks, as are well known in the art. As mentioned above, the audio line signals are also added to the RF video signal.

In the preferred embodiment, the ADC/DAC/CODEC 59 is a CS4216, manufactured by Crystal Semiconductor. The part contains microphone inputs, with programmable gain, as well as outputs with programmable attenuators. Gain and attenuation are both programmably controlled by the DSP 61.

In the alternative, the ADC/DAC/CODEC 59 can be replaced with a TDA1311 DAC manufactured by Philips. If this chip is used, the ADC and CODEC functions will not be available.

Referring now to FIGS. 3 through 5, the video processor 39 electronics are largely contained within one massive custom logic chip, known as an ASIC (Application Specific Integrated Circuit). A video processor meeting the description herein may be purchased from MSU Ltd., 270 Upper 4th Street, Witan Gate West, Central Milton Keynes, MK9 1DP England. As illustrated in FIG. 5, the video processor contains a processor interface 68, a processor cache 69, a memory interface/refresh 70, a video controller 60, an interrupt controller 71, a video blitter 72, a CD drive controller 74, a digital signal processor (DSP) 61, and a DSP memory 76. The processor interface 68, the memory interface/refresh 70, and the video controller 60 are referred to collectively as the video/memory controller 78. The system memory 45, central processing unit 48, and other devices lie outside the video processor 39.

The SYSTEM' bus electrically connects the various devices to the system memory 45. Sharing the SYSTEM' bus are six possible bus masters (in order from highest priority to lowest priority, respectively): the memory refresh 70, the video controller 60, the CD drive controller 74, the DSP 61, the blitter 72, and the CPU 48 (through the processor interface 68). Only one of the bus masters may control the SYSTEM' bus (DATA' bus, ADDRESS' bus, and CONTROL' bus between the video processor 39 and the system memory 45) at any one time.

The video/memory controller 78 controls the SYSTEM' bus, and provides the memory timing signals (e.g., CAS, RAS, write enable, etc.) for memory devices attached to the SYSTEM' bus, as is well known in the art. It also requires memory cycles (video memory cycles are required to read video data from system RAM; since video is generated in real time by this process, the video logic must have memory access when video data is needed), and has effectively the highest priority on the SYSTEM' bus, as mentioned above. It suspends bus master operations during video lines for brief periods to fetch any video display data, and to refresh dynamic RAM (DRAM). It also controls the interface with the CPU 48.

The DSP 61 is a simple, very high-speed processor for sound synthesis, operating at up to 33 million instructions per second (MIPs). It has access to the SYSTEM' bus via a DSP DMA controller (not shown), which allows it to read and write bytes or words into system memory 45. These transfers occur in short bursts, and are under DSP program control. The DSP 61 actually executes programs and stores data in its own private high-speed memory 76.

The compact disk read DMA channel of the CD controller 74 allows the system to transfer CD read data into system memory 45 without any software overhead. It may transfer data directly; it also contains a CD block decoder.

The interrupt controller 71 interfaces six internal interrupts to the CPU 48: video interrupt (highest priority), analog interrupt 1 (AI1), analog interrupt 2 (AI2), analog interrupt 3 (AI3), CD block decoder interrupt, and DSP interrupt (lowest priority). The interrupt controller automatically clears an interrupt when the CPU 48 performs the interrupt acknowledge cycle. A mask bit is available for each of the interrupts.

The blitter 72 is a graphics processor for fast screen updates and animation, acting as a hardware graphics subroutine for the CPU 48 or DSP 61. It will become bus master through blitter program operation, and may therefore own the SYSTEM' bus for considerable periods. However, its priority over the CPU 48 is not absolute; it may be requested to give up the SYSTEM' bus to the CPU 48 when an interrupt occurs. The CPU 48 is the lowest priority bus master at the system level; however, it has complete control of the other hardware, therefore, the use of the SYSTEM' bus is entirely under CPU 48 program control.

The video processor 39 has four major blocks: a video/memory controller 78, a compact disk controller 74, a blitter graphics coprocessor 72, and a DSP audio coprocessor 61. The address space of the CPU 48 is decoded to a number of eight-bit registers within the video processor 39. All internal locations are on even address boundaries; word-wide I/O reads and writes may be performed where appropriate. In this particular embodiment, the byte-wide writes may not be performed on word-wide registers and I/O cycles may not be used to access odd addresses.

In addition to the above registers, the video processor 39 generates three spare general purpose I/O decoder lines (GPIO1, GPIO2, and GPIO3) from the SYSTEM bus, each providing a 32-bit I/O address range. The general purpose decoders may be used to provide three active low chip enables to devices external to the video processor 39.

The video/memory controller 78 performs four functions: video timing, interrupt handling, video display generation, and memory configuration, refresh, and timing.

The video/memory controller 78 has a flexible video timing generator that can be programmed to suit different TV standards and monitors up to a 640 by 480 VGA standard. The position of synchronization pulses, blanking, display area, active video (when the video processor 39 is fetching data from memory) are programmed in clock cycles in the horizontal dimension and in line numbers in the vertical direction. Video timing is broken into two parts. Horizontal timing is defined in terms of clock cycles and is determined by a number of eleven-bit registers. Vertical timing is defined in terms of display lines and is determined by a number of ten-bit registers.

There are nine horizontal registers: horizontal period, horizontal sync, horizontal blanking end, horizontal blanking begin, horizontal display begin, horizontal display end, horizontal fetch begin, horizontal fetch end, and horizontal vertical sync. The value written to the horizontal period register determines the horizontal line length in clock cycles. In one embodiment the line length is one greater than the number written to the horizontal period register. The formula for the required number is: horizontal period=(line length× clock frequency)–one.

The value written to the horizontal sync register determines the width of the horizontal sync pulse. The width of horizontal sync in clock cycles is given by the difference between the horizontal period register and the horizontal sync register. The formula for the required number is: horizontal sync=horizontal period–(horizontal sync width× clock frequency). The horizontal blanking end register determines when the horizontal blanking ends and is the width of the back porch in clock cycles. The horizontal blanking begin register determines where horizontal blanking begins. The formula for the required number is: horizontal blanking begin=horizontal period–((horizontal sync width+front porch width)×clock frequency).

The horizontal display begin register specifies how soon video is generated after the trailing edge of horizontal sync in clock cycles. If the horizontal display begin register is greater than the horizontal blanking end register the video/memory controller 78 outputs the border color in-between. The value written to this register should normally be chosen to put the picture in the middle of the television screen. The formula for a register number to do this is: horizontal display begin=(horizontal blanking end+horizontal blanking begin– (active display width×clock frequency))/2.

The horizontal display end register specifies where the display ends and therefore determines the width of the video display in pixels. It should be programmed with the following number: horizontal display end=horizontal display begin+(number of pixels×clocks per pixel). If horizontal blanking begin is greater than horizontal display end, then the border color will be output until blanking begins.

The horizontal fetch begin register determines where video fetches first start on the line. This should be programmed such that the sixteen byte pixel buffer has just been filled when the display begins. In practice, this means that the value in the horizontal fetch begin register is given by the value in horizontal display begin less a constant which depends on the display mode. The table below contains the constants for various combinations of bits per pixel and clocks per pixel. For example, if four bits per pixel and five clocks per pixel then the constant is 160. Likewise, if four bits per pixel and one clock per pixel, then the constant is 32. Note that if there are 16 bits per pixel and one clock per pixel, then no constant is applicable.

|  |  | Clocks per pixel | | | | |
| --- | --- | --- | --- | --- | --- | --- |
|  |  | five | four | three | two | one |
| Bits per pixel | four | 160 | 128 | 96 | 64 | 32 |
|  | eight | 80 | 64 | 48 | 32 | 16 |
|  | sixteen | 40 | 32 | 24 | 16 | n/a |

The horizontal fetch end register determines where video fetches end on the line. In principle, this is the value in horizontal display end minus the above constant. However, horizontal fetch begin should be rounded up so that horizontal fetch end register minus the horizontal fetch begin register is a multiple of the above constant.

The horizontal vertical sync is identified as wider sync pulses occurring on a number of lines. The width of these pulses is determined by the horizontal vertical sync register which should be programmed as follows: horizontal vertical sync=horizontal period–(vertical sync width×clock frequency).

The video/memory controller 78 also has a large number of vertical registers: the vertical period register, the vertical sync register, the vertical blanking end register, the vertical blanking begin register, the vertical display begin register, the vertical display end register, the video interrupt register and the light pen registers. The vertical period register specifies the number of video lines per field. The vertical sync register determines the number of lines on which vertical sync is generated. It should be programmed as follows: vertical sync=vertical period–lines of vertical sync.

The vertical blanking end register determines how many lines are blanked after a vertical sync. The vertical blanking begin register determines how many lines are blanked before vertical sync. It should be programmed as follows: vertical blanking begin=vertical sync–lines of blanking prior to vertical sync.

The vertical display begin register determines the first line of active video. If this register is greater than the vertical blanking end register the lines in-between show the border color. To position the active area in the middle of the screen this register should be programmed as follows: vertical display begin=(vertical blanking end+vertical blanking begin−number of active lines)/2. The vertical display end register determines the last line of active video. If this register is less than the vertical blanking begin register the lines in-between will show the border color. To position the active area in the middle of the screen this register should be programmed as follows: vertical display end=(vertical blanking end+vertical blanking begin+number of active lines)/2.

The video interrupt register determines the video line on which a video interrupt is generated. This interrupt may be enabled or disabled through the INT register. The interrupt occurs when the video mechanism stops at the end of the display line. It may be used by the processor to change display modes or to perform beam synchronous animation. The register may be reprogrammed within a field to provide several interrupts per field.

The following table provides typical values for the above registers for the various display formats shown. After loading the registers with the below values, the video timing generator is enabled by setting the VIDEN bit in the register MODE2.

| Clock frequency | 50 Hz PAL 320 × 256, 8-bits 22.17 MHz | 60 Hz NTSC 320 × 220, 8-bits 21.48 MHz | VGA 640 × 480, 8-bits 25.17 MHz |
|---|---|---|---|
| Horizontal period | 1418 | 1363 | 790 |
| Horizontal sync | 1314 | 1262 | 703 |
| Horizontal blanking end | 126 | 103 | 48 |
| Horizontal blanking begin | 1271 | 1232 | 688 |
| Horizontal display begin | 378 | 348 | 48 |
| Horizontal display end | 1018 | 988 | 688 |
| Horizontal fetch begin | 346 | 316 | 32 |
| Horizontal fetch end | 986 | 956 | 672 |
| Horizontal vertical sync | 103 | 89 | 0 |
| Vertical period | 312 | 262 | 525 |
| Vertical sync | 309 | 259 | 524 |
| Vertical blanking end | 20 | 15 | 34 |
| Vertical blanking begin | 307 | 257 | 514 |
| Vertical display begin | 35 | 26 | 34 |
| Vertical display end | 291 | 246 | 514 |

The video/memory controller 78 has three color resolutions available: four bits per pixel, eight bits per pixel, and 16 bits per pixel. In four- and eight-bit modes,-the pixel is a logical color that indexes an 18-bit physical color stored in the palette. In 16-bit mode, the pixel is a physical color in which bits zero to four are blue, bits five to ten are green and bits 11 to 15 are red. Because there are six bits of green but only five bits of blue and red, the least significant bits of blue and red output from the chip are always logical ZERO in 16-bit mode. The border color is a 16-bit register which is displayed as a 16-bit pixel.

In eight-bit mode, the pixel addresses the whole 256 by 18 palette. In four-bit mode the pixel addresses 16 entries from the palette in which case the top four bits of the addresses are supplied from the index register.

Two variations are available in eight-bit mode. In color hold mode if the pixel takes the value zero, then the color of the previous pixel is displayed. This can be used to fill large areas of color simply by setting the left most pixel.

In variable resolution mode, the most significant pixel determines whether the pixel is displayed as one seven-bit pixel or two three-bit pixels. If the bit is clear, the pixel is displayed as one seven-bit pixel; if the bit is set then bits zero to two are displayed first followed by bits four to six. In this case, the two high resolution pixels address eight entries from the palette. The top five bits of the address are supplied from the index register. Variable resolution mode is useful for displaying small regions of high resolution text amid a lower resolution, but more colorful, background. This mode is not available in one clock per pixel resolution.

In eight-bit mode any of the bits can be sacrificed and used for other purposes. For instance, a bit could be used to identify "hot spots" for collision detection. Alternatively, bits could be used to encode image "depth" so that one image can move in front of or behind another. To sacrifice a bit, the same bit in a masked register is set and that bit will be replaced from the corresponding bit in the index register.

There are five widths of pixel: one clock, two clocks, three clocks, four clocks, and five clocks. These correspond to dot clocks of around 24 MHz, 12 MHz, and 6 MHz. The highest dot clock may not be used with the 16 bits per pixel display mode. Two other combinations: one clock 8-bit and two clock 16-bit may only be used if 32-bit DRAM is fitted. If external hardware is fitted as will be in the applications here described, the video processor 39 can gen-lock to an external video source and mix (encrust) local video with external video on a pixel by pixel basis. This is significant with regard to certain display to be generated in accordance with this invention as described more fully hereinafter.

The memory map of the screen is not tied to the video display width but is defined independently. The base address of the screen can be anywhere in system memory 45. The width of the screen memory is the power of 2 from 128 to 2048 bytes. The height of the screen is a power of 2 from 32 K to 2 megabytes. Video addresses on the same line wrap within the smaller boundary. This arrangement allows the screen to be placed within a larger virtual screen and panned and scrolled within it.

Various registers control the video modes discussed above.

The video mode register controls the features listed above. Bits zero and one determine the number of bits per pixel. Bits two and three determine the pixel width in clock cycles. Bits four through six determine the first break in the video address and hence the display width in bytes. Bits seven through nine determine the second break in the video address and hence the display height in bytes. Bit ten turns the sync outputs into inputs which can reset the horizontal and vertical timers for rapid locking to an external video source. Bit 11 controls encrustation, which is the overlaying of an external video source using an external video multiplexer. The multiplexer is controlled by the "INC" pin of the AN/CD controller/coprocessor. Selected bits of the color are used to control encrustation. Bit 12 controls border encrustation, which is the same as bit 11 but only applied to border colors. Bit 13 sets a variable resolution mode. Bit 14 sets the color hold mode, in which color 0 is replaced by previous non-zero color in current scan line. Bit 15 enables Pixel clock widths of three and five based on Bits 2, 3, and 15, as shown in the table below.

| Bit 2 | Bit 3 | Bit 15 | Pixel Clock |
|---|---|---|---|
| 0 | 0 | 0 | Four clock cycles/Pixel |
| 1 | 0 | 1 | Two Clock Cycles/Pixel |
| 0 | 1 | 0 | One Clock Cycles/Pixel |
| 1 | 1 | 0 | Undefined |
| 0 | 0 | 1 | Three Clock Cycles/Pixel |
| 1 | 0 | 1 | Five Clock Cycles/Pixel |
| 0 | 1 | 1 | Undefined |
| 1 | 1 | 1 | Undefined |

The video/memory controller 78 also has a pixel mask register and a palette index register. For every bit set in the mast register, the corresponding bit in the pixel is replaced by the bit from the index register. The upper bits in the index register form the high part of the palette address for 4-bit pixels. The border color register is a 16-bit register that defines the border color. The color is displayed in the same way as 16-bit pixels: bits zero to four are blue, bits five to ten are green, and bits 11 to 15 are red.

The video/memory controller 78 also has two screen address registers that define the 24-bit base address of the screen in system memory 45. This is the address of the top left pixel on the screen.

The video/memory controller 78 also has an auxiliary video mode register MODE2 that provides additional control over video and various test logic. Bit zero enables the light-pen registers so that the horizontal and vertical counters can be read. Bit two enables the video timer, bits three and four determine the refresh frequency with one indicating a refresh frequency of clock/128, two indicating a refresh frequency of clock/256, and three indicating a refresh frequency of clock/512. Most DRAMs require a refresh frequency of 64 KHz or above. The refresh controller waits until eight or more refresh cycles are required then requests the SYSTEM' bus and does the required number of GAS before RAS cycles. When bit six is set, the video mode is double buffered and can only change during blanking. The CPU 48 sets this bit for clean mode changes in split screen operation. Bit seven inverts the polarity of vertical sync. Bit eight inverts the polarity of horizontal sync and bit nine is not used.

The palate is a 256 by 18 bit block of RAM at F10000H-F103FFH. Each entry contains six bits each of green, red, green and blue. Each entry extends across two words. The blue and green bits appear in the high word. The red bits appear in the low word. Bits two through seven of the high word are blue; bits 10 through 15 of the high are green and bits two through seven of the low word are red. To write to an entry in the palette, the CPU 48 must first write the red bits to the low word, then the green and blue bits to the high word. The CPU 48 should only write to the palette during border or blanking or speckles will appear on the video.

The cache 69 is not a cache in the sense that it prefetches instructions for the CPU 48. Rather, the cache 69 is a 512×16-bit static RAM located at F14000H to F143FFH that can be used by the CPU 48 for variables, stack, or program code to speed up program execution. It comprises static RAM and is not subject to page faults. Placing data, stack, or program code in the cache 62 allows quicker accesses and fewer page faults. In this embodiment, the cache is small and byte writes are not allowed to the cache area. Interrupt service routines may not push bytes onto the stack.

Video/memory controller 78 supports six interrupt sources: video input interrupt, three analog interrupts, CD block decoder interrupt, and a DSP 61 interrupt. The analog interrupts allow simple analog-to-digital converters to be implemented. A monostable vibrator is implemented from a diode, a capacitor, and a potentiometer. The capacitor is discharged by vertical sync and begins charging at a rate dependent on the potentiometer setting. When the voltage on the capacitor reaches the threshold of the input to the video processor 39, an interrupt is generated. The processor can then read the vertical counter to get a measure of how quickly the capacitor charged, an hence the potentiometer setting.

The video/memory controller 78 also has an interrupt enable register allowing all six interrupts to be independently enabled or disabled. Writing a logical ONE to any bit in the interrupt acknowledge write register clears the corresponding interrupt. The interrupt read register reflects all pending interrupts.

The video/memory controller 78 decodes the 16 megabyte address range of the 80376 CPU 48 into the following memory map: eight megabytes of DRAM0 (0H - 7FFFFFH), seven megabytes of DRAM1 (800000H - EFFFFFH), 64 kilobytes of ROM0 (F00000H - F0FFFFH), 64 K of internal memory (F10000H - F1FFFFH), and a 896 K block of ROM1 (F20000H - FFFFFFH). The 64 kilobytes of internal memory comprises palette RAM, blitter registers, and DSP registers and memory. The palette address range was stated above. The blitter registers extend from the range F10400H to F107FFH. The DSP memory extends from F10800H to F18000H.

The on-board screen RAM and system RAM is 512K of DRAM. The onboard DRAM comprising the screen/system RAM may be either 16-bits or 32-bits wide. Suitable DRAM are the TCS14170BJ 256 kilobyte by 16-bit memory chip, manufactured by Toshiba. The size of the DRAM is determined by the video processor 39 during reset but does not directly affect the CPU 48. Instead, it allows the video/memory controller 78 to operate more quickly leaving more bandwidth available to other bus master candidates. Certain display and blitter modes are only possible with 32-bit memory. Two banks of DRAM may be attached, as indicated above. If small amounts of DRAM are attached, then they will be repeated throughout the memory map shown above.

The bootstrap ROM is always 16 bits wide. The bootstrap ROM comprises two 27C512 erasable programmable read-only memories, manufactured by numerous manufacturers, thereby giving 128K of bootstrap ROM. Following a reset, the one megabyte window from F20000H to FFFFFFH containing ROM and internal memory is repeated throughout the 16 megabyte address range. This allows for a variety of processors to boot with the video processor 39. The memory map above is adopted the first time with the memory type register is written to by the CPU 48. The video/memory controller 78 performs page mode cycles on the system memory 45 wherever possible. These are quicker than normal memory cycles and occur if successive reads and writes are within the same page. The video/memory controller 78 needs to know the number of columns in the DRAM, which is programmed in the memory type register. In the memory type register, bit 0 and 1 determine the number of columns in the DRAM, with 0 indicating 256 columns, 1 indicating 512, 2 indicating 1024, and 3 indicating 2048.

The video/memory controller 78 supports seven types of transfers: a normal DRAM cycle (4 clocks), a page mode DRAM cycle (two clocks), ROM cycles (6 clocks), internal memory (2 clocks), external I/O (6 clocks), interrupt acknowledge (2 clocks), and internal I/O (2 clocks). The CPU 48 will cycle in one more clock cycle than the actual transfer. Internal bus masters can cycle in the transfer time.

The video/memory controller 78 uses a crystal oscillator for a crystal that is the 2X (2 times speed) clock for the CPU 48 and is a multiple of the television chrominance (chroma) subcarrier. This crystal clock is buffered and output to the CPU 48. The same clock is put through a divide by two and this is output as the main system clock. This clock is input to the video processor 39 through a separate pin. The reason for outputting and inputting the clock is so that the relative skew between the CPU 2X clock and the main system clock, can be adjusted one way or the other by adding small delays to either path. The crystal frequency also is divided by a programmable divider which can divide the crystal frequency by a number between 1 and 15 and produce an output waveform with an even mark to space ratio. This is used as the television color subcarrier.

The chroma divider register is a 4-bit register that defines the ratio of the television color subcarrier (chroma) to the 2X crystal frequency. It should be programmed as follows: chroma=2X crystal frequency/chroma frequency−1.

The video/memory controller 78 also has a status register. If the status register bit 0 is set, the video timing should be set up for PAL (European television signal standard). If bit 0 of the status register is clear, then the video timing should be set up for NTSC. If bit 1 of the status register has been set, then there has been a light-pen input in the current field. This bit is set by the light-pen and cleared by the vertical sync.

The video/memory controller 78 can be put into a mode during reset after which it only responds to two-word wide I/O locations and 64 K memory locations. The actual location of the I/O locations is determined by a chip select input so the locations can be determined externally. This "peephole" mode allows the video processor 39 to occupy only small gaps in the I/O and address memory map of the system 30.

The registers are 32-bits wide and must, therefore, be accessed as two 16-bit accesses. To address all the I/O registers within the video processor 39, the regular I/O address of the required register is first written to the lower word (a[1] low) then that register can be read or written at the upper word (a[1] high). To address all the memory inside and outside the video processor 39 the 64K window can be moved to any 64K boundary in the 16M address space normally decoded by the video/memory controller 78 by writing to the bank register. The bank register is an eight-bit register providing the eight most significant bits when addressing memory in peephole mode. For example, to access the palette, formerly at F10000H, the CPU 48 must write 0F1H to the bank register and then read and write at the bottom of the peephole location, determined by the external chip select.

The blitter 72 is a graphical coprocessor whose purpose is to perform graphics creation and animation as fast as possible (limited by the memory bandwidth). It executes commands written by the CPU 48 and the DSP 61 into memory. It can perform arbitrarily long sequences of graphics operations by reading new command sets from system memory 45. While it is performing graphics operations, the blitter 72 becomes a SYSTEM' bus master, and denies the CPU 48 any bus activity whatsoever. This is reasonable because the blitter 72 is being used to perform operations that the CPU 48 would otherwise have performed, and is therefore speeding up program operation. This also removes the need for any synchronous control programming for blitting operations and the need for any interrupt generation hardware in the blitter 72. However, to allow real time programming of either of the other two processors (the DSP 61 and the compact disc DMA), the blitter 72 will suspend its operation and grant the SYSTEM' bus to the DSP 61 or the compact disc DMA channels if they require a DMA transfer. It will also suspend itself and give up the SYSTEM' bus to the CPU 48 if an interrupt occurs. During any of these transfers, the current operation is suspended but will restart when the interrupt signal becomes inactive or when the DSP 61 DMA access completes.

The operation of the blitter 72 is best viewed as a simple program:

```
read command from memory
for n=0 to outer_count
    read parameters from memory
    for m=0 to inner_count
        if SRCEN then read source from memory
        if DSTEN then read destination from memory
        write destination to memory
    next m
next n
```

The commands and operands are written to memory by either the CPU 48 or the DSP 61.

The blitter 72 has several registers in the video processor 39 I/O space: (1) two writable blitter program address registers, which share the same I/O address as two readable blitter destination registers, (2) a writable blitter command register, which shares the same I/O address as a first readable blitter source address register, (3) a writable blitter control register, which shares the same I/O address as a second readable blitter source address register, (4) a readable inner count register, (5) a first writable blitter diagnostics register, which shares the same I/O address as a readable, blitter outer count register, (6) a second writable blitter diagnostics register, which shares the same I/O address as a readable blitter status register, and (7) a third writable blitter diagnostics register.

The blitter 72 may be operated in a variety of modes to perform graphics and block move operations. The blitter 72 has an internal architecture divided into three largely separate blocks: the data path, the address generator, and the sequencer. The data path contains three data registers: the source data register, the destination data register, and the pattern data register. The data path also contains a versatile comparator to allow intelligent blitting operations, and a logic function unit (LFU) to generate the output data.

The address generator contains three address registers: these are the program address register used to fetch blitter commands, and the source register and the destination address registers. It also contains an arithmetic logic unit (ALU) with an associated step register to update addresses, and a multiplexer to generate the output address.

The sequencer acts in software terms as the program that the blitter 72 runs, with two loops (an inner loop and an outer loop) and a several procedures, as illustrated above with the short simple program. The program is fixed, although various parts of its operation are conditional upon flags in the blitter command register and the loop counts are also part of the command.

The data path contains three data registers and two data manipulation blocks: the logic function unit, which can combine the contents of the data registers in a number of useful ways to produce the output data, and the comparator, which can perform certain comparisons on the data to inhibit write operations, and optionally stop blitter operation.

The data path can handle data of four sizes: 32-bit, 16-bit, 8-bit, and 4-bit. Long words (32-bits wide) are used when performing fast block moves and fills. Pixels (4-, 8-, or 16-bits wide) may be manipulated using all the blitter modes, such as line-drawing, multiple plane operations, character painting, etc.

The majority of the data path is 16-bits wide, which is the maximum screen pixel size. However, the source data register is 32-bits wide, and the top 16-bits of the source data register are used to produce the top 16-bits of the data written in 32-bit mode, regardless of the mode of the logical function unit. Thus, there are two 16-bit wide registers (pattern data and destination data) and one 32-bit wide data register (source data register). The source and destination data registers are loaded from the source and destination addresses in system memory 45 when the corresponding read cycles are enabled in the inner loop. However, all three data registers are loaded at the start of blitter operation with the pattern data, and this may be used as an additional source of data, either in producing the output data or in the comparator. For example, the data in the pattern data register could be a mask, a pattern for writing, or a reference value, for example. The pattern data is loaded into both words of the source data register.

The logic function unit generates the output data, which is written to the destination in system memory 45. It can perform any logical combination of the source and destination register pixels. "Source data pixels" may be selected from either of the source data register or the data pattern data register. The LFU selects any of the four Boolean minterms (A & B, A & B, A & B, and A & B) of the two sets of input data from the data registers, and generates the logical OR of the two selected minterms. This allows any logical combination of input data; thus 16 functional possibilities exist.

In 32-bit mode, the LFU will normally be set to produce source data, because it is only 16-bits wide. The upper sixteen bits written during a long-word write are always derived from the top sixteen bits of the source register.

The comparator can perform a variety of comparisons on the data in the source, destination, and pattern data registers. If its comparison conditions are met, then it generates an inhibit signal. The inhibit signal is used to inhibit a write operation, and optionally, to stop the blitting operation. The comparator may also be used to provide a pixel plane effect, to give transparent colors, for collision detection and system memory 45 search operations, and as an aid to character painting.

A multiple plane operation is supported by assigning a plane number to every pixel. This mode is only applicable to 4 and 8-bit pixels. In 8-bit pixel mode, two of the 8 bits (bits 6 &7) are used giving two or four planes; in 4-bit (nibble) pixel mode, one of the 4 bits (bit 3 & bit 7 of the two-nibble byte) is used giving two planes. The comparator can produce an inhibit output if the plane number of the destination data is not equal to or greater than the plane number of the source data, or any combination of these. This means the data being written onto the screen can be masked by data already present in a different plane.

The comparator can produce and inhibit output if the entire source pixel is equal to or not equal to the destination pixel. This may be used, for example, for searching system memory 45 for a particular value and, more importantly, for designating a color to be transparent and holding the transparent color value in a data register. This applies to 16-, 8-, or 4-bit pixels.

The blitter 72 also has a comparator bit to pixel expansion mode operation. This comparator operation allows bit to pixel expansion of data, used, for example, for character painting. In this mode, the comparator selects a bit of the source byte based on the value of the inner counter and inhibits the write operation if this bit is a logical ZERO.

The blitter 72 makes provision for handling three pixel resolution modes. These are: 16-bit mode where each word corresponds to one pixel, 8-bit mode, where each byte corresponds to one pixel, and 4-bit mode, where each byte corresponds to two pixels. In 8- and 16-bit pixel modes, the data path is handling one pixel at a time, and operation is straight forward. In 4-bit pixel mode, however, only half of the byte that is read from or written to system memory is the current pixel, therefore, certain additional requirements are placed on the data path. In a 4-bit mode write operation, unchanged destination data is written to the half of the data byte that does not correspond to the current pixel. Thus, destination reads must always be enabled in 4-bit mode (set control bit DSTEN). This must be done because there is no provision for writing less than one byte into main memory.

It is also possible that the source 4-bit pixel address and the destination 4-bit pixel address point in different halves of the corresponding bytes of RAM. If this is the case, a shifter swaps the two halves of the source data. In 4-bit mode, the two nibbles (half a byte; 4 bits) of the pattern byte should normally be set to the same value. Note that the pixel with program in the blitter 72 does not have to match the display width, and the most efficient way of moving large amounts of data is 32-bit mode. Recall that such mode transfers must be long-word aligned and the system must be fitted with 32-bit RAM.

The blitter 72 also has an address generator. The address generator contains three address registers, an increment or step register, an address adder, and an address output multiplexer. The three address registers hold the source address, the destination address, and the program address. Each of these registers is a 24-bit register allowing the blitter 72 to address up to 16 megabytes. In addition, the source and destination address registers contain a nibble bit used in 4-bit pixel mode. The program address register holds the address that the program is fetched from, and is incremented by one word each time a memory cycle is performed using it. This register is always even, thus, bit 0 must always be a logical ZERO.

The source and destination address registers are updated after each cycle, and at other times, using an adder that allows them considerable flexibility in the objects to which they refer. All source and destination address updates, may be performed optionally on just the bottom 16 to 19 bits of the address register. This means that the blitter 72 will then effectively operate in 64K, 128K, 256K, or 512K pages. In this mode, if an address overflows within a page, it will wrap and the overflow or underflow will be lost.

The blitter 72 also has an address adder, which is a 25-bit wide adder used to update addresses. It allows either a constant value of .5, 1, or 2 or a variable stored in one of the step registers, to be added to an address value. It can also subtract the same values. The 25th bit is the nibble part of the addresses, as stated above. An increment of one pixel has a different effect on the address depending on the current setting of the screen resolution.

All address registers are updated automatically at the end of the appropriate memory cycles; source read for the source of address register, and destination write for destination address register. Addresses can be made to wrap vertically by using the SWRAP and DWRAP bits in the blitter command, and horizontally by using the SLWRAP and DLWRAP bits in the blitter control register.

The address output multiplexer provides the external address to the system memory 45. It provides three types of addresses: source address, destination address, and the program address. These are derived directly from the corresponding address registers.

When the blitter 72 is drawing lines, the address registers are used in a different way than normal. The destination address register is used as the line draw address, and the source address register and the step register are used as delta one and delta two respectively. During line drawing delta two is subtracted from delta one, and the borrow output produced is used to determine what is added to the destination address register. For further details, see the section on line drawing below.

The blitter 72 also has a sequencer which controls the operation of the blitter 72. The flow of control is best considered at two levels. There is an outer Iccp governing the overall flow of control and an inner Iccp which performs the actual blitting or line drawing operation. The three sections within the outer Iccp: the command read procedure, the parameter read procedure, and the inner loop.

The inner loop performs the actual blitting or line drawing operations. An inner loop cycle can contain up to three memory cycles. These are a read from the source address, a read from the destination address, and a write to the destination address. All three cycles are optional. If the loop includes a source read, or a source read and a destination read, then the comparator inhibit mechanism is tested before the destination write occurs. This allows the write cycles to be bypassed when a comparator inhibit condition is met. When the comparator inhibit conditions are met, it is possible to have the current operations cease and control returned to the CPU 48. The program may then examine the address registers to determine where the inhibit has occurred, so that collision detection may be performed. The CPU 48 may then determine whether to resume the operation or abort it. The inner loop performs operations until the inner loop counter reaches zero. The inner loop counter is a 10-bit counter, so the inner loop can iterate any number of times from 1 to 1024.

The blitter 72 makes provision for collision detection by allowing operation to stop when a comparator write inhibit occurs. When this happens, control returns to the CPU 48, which may then examine the internal state of the blitter 72 to determine what has caused the collision. At this point, the CPU 48 may choose to allow the blitter 72 to resume the operation it was performing, or may reset it back to its idle state. Either a reset or a resume command must be issued before the blitter 72 may be used for another operation. Note that while the blitter 72 is in the suspended state, a new value may be written to the command register, so that the collision stop mechanism may be disabled.

The parameter read procedure is a very straightforward sequence that loads a new set of parameters to the inner loop. It reads from memory, in order, the inner loop counter value, the step register values, and the pattern value, which is used to preset the data registers. The inner count effectively becomes the number of times the inner loop is executed. The step registers are used for address incrementing and the pattern register is used for data manipulation.

The parameter read procedure is called as part of a command read procedure at the start of a blitting operation and is also called if required by a blitting operation, as determined by the PARRD control bit. Extra parameter reads occur between passes through the inner loop to allow parameters to be altered, thereby allowing operations such as irregular shape painting and run-length encoded data decompression.

The command read procedure is used to start a new blitting operation. The blitter 72 starts in an inactive reset state, which represents the normal inactive state of the blitter 72. From this state a command register write is performed to start the blitter 72, usually preceded by a write to the program address register. A full set of operational parameters is loaded from program count address which is auto-incremented, and control passes out of the command read loop. When a blitting operation is complete, a new command is read from the program count address and if this command leaves the blitter 72 in run mode, then a new set of parameters is loaded and another operation is started. Otherwise the blitter 72 enters its stopped state and returns the SYSTEM' bus to the CPU 48. The above mechanism allows the blitter 72 to perform arbitrarily long sequences of graphics commands without requiring any processor intervention. This is extremely useful because processor I/O write cycles are relatively slow in comparison to blitter memory reads.

Normal operation of the outer loop starts on exit from the command read loop. The parameter read loop is then entered to read the first set of parameters and the inner loop is entered with the inner counter being loaded to its initial value before the start of operation. The outer counter is then decremented, and, if it is zero, the command read loop is entered. Then either or both of the source address and destination address registered may be updated with the contents of the step register. The parameter read loop may then be optionally entered to update various inner loop parameters, before the inner loop is entered again. The two loops allow the blitter 72 to perform operations on with two-dimensional screen structures, with the outer loop address register updates moving screen address pointers onto the start of the structure on the next line. The parameter read loop adds flexibility while allowing the screen structure parameters to be altered on a line-by-line basis.

The blitter 72 also has a memory interface state machine, which controls the cycle timing generation and the bus arbitration of all memory cycles. The blitter 72 assumes control over the SYSTEM' bus from the CPU 48 for the duration of a blitter command sequence. This is subject to the bus handover latency discussed above, but as soon as the blitter 72 is granted the SYSTEM' bus its operation will start.

The memory interface will give up the SYSTEM' bus to the DSP 61 or the compact disc read channel as soon as one of these requests the SYSTEM' bus, pausing only to complete any current memory cycle.

Interrupts will also cause the blitter 72 to suspend operation, unless masked in the blitter control register. The blitter 72 detects the state of the interrupt line itself and uses this to suspend operation. Operation will resume as soon as the interrupt line resumes to its prior state, which occurs when the CPU 48 write to the acknowledge port occurs. This may not be necessarily the end of the interrupt service routine, therefore programmers should be wary of stack crawl, and should normally keep interrupts disabled during a service routine. The blitter 72 resumes operation as soon as the interrupt line is cleared without intervention from the CPU 48. The blitter 72 only responds to the internal interrupt sources (the video interrupt the analog input interrupts and compact disk interrupts). Any external CPU interrupt source has no effect on the blitter 72.

The blitter 72 has numerous modes of operation. The simplest operations performed by the blitter 72 are those involving copying one block of system memory 45 to another and filling a block of system memory 45 with a predefined value. These operations can be performed on linear parts of system memory 45 and on arbitrary screen rectangles. The destination data register is used as the address of the system memory 45 being modified and the source address register is used as the address of the data being copied, if it is a copy operation.

When the operation is to be performed on linear areas of memory, most of the address control bits will be set to zero. The step register is not used, and the only requirement is to determine whether the copy will be made with the address incrementing or decrementing, in setting DSIGN and SSIGN appropriately. Note that the initial value placed in the address register should be the bottom of the area upon which the operation is to be performed if the sign bit is not set and at the top if it is set. In both cases, the first pixel read or written will be the first address. The length of the operation will be placed in the inner counter and the outer counter set to one.

If the block being operated upon is very large both the inner loop and outer loop counters may have to be used and the number of pixels operating on will be given by the product of the inter and outer counter values. When either or both of the source and destination data are rectangles rather than linear areas, then the inner loop counter will contain the rectangle width and the outer loop counter the rectangle height.

The appropriate step register is set to the address increment from the right-hand side of the rectangle around to the left-hand side on the next line. The SRCUP and DSTUP bits are set according to whether the source or destination are rectangles. In 8- or more bits per pixel mode, neither SRCEN nor DSTEN will be used for memory fill, bit SCRCEN should be set for memory copy. In 4-bit pixel mode, DSTEN must always be set as well, so that a destination read is performed to avoid corrupting the other pixel. Note that using this method will be slower than otherwise.

The blitter 72 draws lines based on the well known digital differential analyzer (DDA) algorithm. The basis of this algorithm is that for a given line one of the X address or the Y address is always incremented for every pixel drawn, while the other one is also incremented if a suitable arithmetic condition is met. The algorithm used by the blitter 72 computes the arithmetic condition that causes the conditional increment by repeated subtraction of the smaller of dx or dy from a working value with the larger being added back when underflow occurs, effectively using division to calculate the gradient. The notation "dx" refers to the distance along the X axis that the line corresponds to and is given by $|(X1-X2)|$ where X1 and X2 are the X coordinates of the 2 points and the vertical bar notation means the magnitude or absolute value of their difference. Thus if a line is being drawn from (X1,Y1) to (X2,Y2), then $dx=|(X1-X2)|$ and $dy=|(Y1-Y2)|$. From these, D1 (referred to as "delta one" above) is given by the larger of dx and Dy, D2 (referred to as "delta two" above) by the smaller. Then, for each pixel drawn, D2 is subtracted from a working value which is initially set to D½ and the sign of the result of this subtraction (indicating underflow) is the arithmetic condition for the conditional part of the screen address update. When this underflow occurs, the original value of D1 is added back to the working value. It can be seen that the ratio of dx to dy will give the frequency with which of this underflow and adding back occurs. The ratio between them is of course the gradient of the line.

The values used to create a line draw are set in the blitter command as follows: the starting point of the line is the destination address, D1 is placed in bits 10 to 19 of the source address register and D½ is placed in bits 0 to 9. D1 is also the inner counter value although D1 plus 1 should be used if both end points of the line are to be drawn. D2 is placed in the destination step register. If DX is greater than DY, then the YFRAC flag is set, otherwise it is cleared. SSIGN gives the sign of the X-address updates, DSIGN gives the sign of the Y-address updates.

While drawing lines, all the registers in the address section are occupied in computing the line address; thus the blitter has no ability to move data from somewhere else when drawing lines. Therefore, the data written at the line address has to be given either directly by the pattern data or by combination of the pattern register and the data already there, according to the logical function unit. Consequently, SRCEN should not be set, otherwise the blitter would produce seemingly random data. While drawing lines the inner counter is set to the length of the line, and the outer counter is set to one. In 8 or more bits per pixel mode, DSTEN need not be set, unless used for read-modify-write operations. In 4-bits per pixel mode, DSTEN must always be set so that a destination read is performed to avoid corrupting the other pixel.

The blitter 72 also has the ability to paint characters on the screen in a single operation. Character painting as far as the blitter 72 is concerned involves painting a rectangular area up to 8 pixels wide and of arbitrary height. The pixels in this area are either written to or left unchanged according to a bit pattern. This mode is not restricted to character painting, but may also be used to expand any graphics stored as a monochrome bit plane.

During character paints, the source register addresses the bit pattern, normally part of the font, where each byte corresponds to one row of the character. Thus, blitter fonts may be up to 8 pixels wide however, wider fonts may be used, but these will require more than 1 blitter paint operation to paint a character. Character painting is essentially a block move from the character font located in system memory 45 to the destination address.

The data is arranged with the bit corresponding to the left-most pixel in the least significant bit, and the top of a character at the lowest address. If the data is less than 8 pixels wide, then the least significant bits of the font data are not used.

The destination address register is used to address the area of the screen to which the character is to be painted. Normally this area has been cleared to the required background color by a previous blitter operation. The destination address is initialized to the top left-hand corner of the character. The character to be painted is a rectangle, and, therefore, the destination address is programmed correspondingly. The inner counter is sent to the width of the character and the outer counter to its height. The destination step register is set to the screen width less the width of the character. The DSTUP bit is used to allow the destination address to be updated between passes through the inner loop.

Inner loop control bits DSTEN and SRCENF are set, character painting being the reason for the existence of SRCENF. This allows the font byte for each row to be read just once. The comparator is used to control the painting of pixels, therefore the CMPBIT control bit is set, to enable its bit to byte expansion mechanism.

The color to be painted is set as the pattern, and this will normally be held in the pattern data register. In 4-bit pixel mode, DSTEN will be set, and the destination data register will hold the read values so that the other half of the byte may be written back undisturbed. The source data register holds the font pattern, as mentioned above.

The blitter rotate and scaling mode uses the shading ALU, but instead of producing three DDA-based data values, it produces two DDA-based address values, X and Y. Normally, these values are used to traverse a source data field at arbitrary angles and rates so that the destination data corresponds to a scaled and/or rotated version of them.

The red value generator gives the X value and the green value generator gives the Y value. The blue value generator is not used, and clearly shading cannot be used in conjunction with this mode. As the rotation requires higher accuracy than shading, four extra integer bits are added to the X and Y values. These are set up in rotate registers zero and one. All calculations are performed to 10 point bit accuracy.

As with shading, the delta values are added to X and Y after each pixel is drawn in the inner loop. The step values are added in the outer loop, and both the SRCUP and DSTUP flags must be set for them to be added. The delta and step values may be either positive or negative, and no add or saturation occurs, unlike shading mode.

Normally, rotation and scaling are performed by setting the destination address pointer to performing normal raster scan over the destination rectangle, while the source pointer traverses over the source data at a suitable gradient and rate. This ensures that the destination data is contiguous, and that no more blits (blitter operations) than necessary are required. The source data should be surrounded with a suitable transparent color if the target area is not rectangular.

A blitter command is given as a table of data in memory. The blitter 72 loads the contents of the table into its registers and performs the specified operation. The blitter 72 will receive successive sets of commands until a STOP instruction is read into the command register.

The blitter program address must be set up before the command word is issued. The blitter program address is given by the program address registers, which together form the full 24-bit address. The program must lie on a word boundary.

A full table of blitter command data starts with a command word. However, the first blitter command in a sequence has its command word written to the command register by an I/O cycle of the CPU 48; thus, the blitter command starts reading the command data from the second word. Similarly, the last blitter command need consist of no more than a command word with the run bit clear.

A blitter command takes the form of numerous command bits and control bits, a 24-bit source address, a 24-bit destination address, a 10-bit outer count value, a 10-bit inner count value, a 12-bit signed source step, a 12-bit signed destination step, and a 15-bit pattern value. If the SHADE bit is set, then 9 additional words are fetched: red, green and blue initial values (6 integer bits and 10 fraction bits), red, green and blue delta values (same) and red, green and blue step values (same).

The command bits are as follows. Setting the RUN bit causes the blitter 72 to start operation. It is used when writing to the command register as an I/O port to start the blitter 72 reading a command. If the blitter 72 loads a command with the RUN bit cleared as part of a command read, then operation ceases. Setting the COLST bit causes operation to stop if a collision (write inhibit) occurs. From that point, print operation can be resumed by the CPU 48 or aborted, and various internal registers may be read. Setting the PARRD bit requires the blitter 72 to read a new parameter set from the program counter address, every time the inner loop exits and the outer loop has not reached zero. Setting the SRCUP bit requires the contents of the step register to be added to the source address on exit from the inner loop if the outer count has not reached zero. Setting the DSTUP bit requires the contents of the step register to be added to the destination address on exit from the inner loop if the outer count has not reached zero. Setting the SRCEN bit enables the source address read in the inner loop. This also causes the source address register to be incremented according to the pixel size. Setting the DSTEN bit enables a destination address read in the inner loop. This does not affect the destination address register, which is incremented as part of the destination write cycle. Setting the SRCENF bit causes the source address to be read when the inner loop is first entered, but not subsequently entered. This is a special case of SRCEN and is relevant to the character paint mode, as described above. SRCENF has no affect if SRCEN is set. The two bits PSIZE0 and PSIZE1 select the pixel size, 0 to 3 corresponding to 4, 8, 16, and 32 bits respectively. 32 bits is for data moves in a 32-bit system only, as described above. The 2-bits WIDTH0 and WIDTH1 select the screen width, in bytes, 0 to 3 corresponding to 256, 512, 1024, and 2048 bytes, respectively. Setting LINDR puts the blitter 72 into line-drawing mode. This mode uses both the source and destination address registers to generate the line-draw address, which may be used for both reading and writing. Setting the YFRAC bit indicates to the blitter 72 which of the X and Y addresses have the fractional increment in line-drawing mode. It is set if the Y address has the fractional increment. Setting the PATSEL bit selects the pattern data register to replace the source data register as the source input to the logical function unit. This bit is relevant to character painting, where the source data register will contain the font data, and the pattern data register contains the ink color. Setting the shade bit enables output from the shading ALU as write data. This bit is only valid for 8- and 16-bit pixels.

The blitter 72 has several types of control bits: source control bits, destination control bits, logic function unit control bits, and comparator control bits. The blitter 72 has several source control bits. Setting the SWRAP bit causes source address updates to wrap on a programmable boundary, as opposed to running linearly through memory. Bits SWRAP0 and SWRAP1 control the size of the SWRAP function, which makes the source address pointer wrap vertically, with 0 to 3 corresponding to 64K, 128K, 256K, and 512K screens, respectively. Setting the SRCCMP bit selects the source data register as the source input to the comparator. If it is cleared, the pattern data register is used. Setting the SLWRAP register makes the source pointer wrap within the line width for inner loop updates. Setting the SSIGN bit sets the sign used when updating the source address. Setting it causes the source address to be decremented rather than incremented. This bit makes X negative in line-drawing.

The blitter 72 also has several destination control bits. Setting the DWRAP bit causes destination address updates to wrap on a programmable boundary, as opposed to running linearly through memory. Bits DWRAP0 and DWRAP1 control the size of the DWRAP function, which makes the source address pointer wrap vertically, with 0 to 3 corresponding to 64K, 128K, 256K, and 512K screens, respectively. Setting the DSTCMP bit selects the source data register as the source input to the comparator. If it is cleared, the pattern data register is used. Setting the DLWRAP register makes the source pointer wrap within the line width for inner loop updates. Setting the DSIGN bit sets the sign used when updating the source address. Setting it causes the source address to be decremented rather than incremented. This bit makes Y negative in line-drawing.

The blitter 72 also has logic function unit control bits. The logic function unit controls the data that is written in a destination write cycle. The LFU allows any logical combination of the source and destination data. This is achieved by each of the LFU bits LFU0 through LFU3 selecting one of the minterms, with the output being given by the logical OR of the selected terms. A 0 value corresponds to NOT source and NOT destination, 1 corresponds to NOT source and destination, 2 corresponds to source and NOT destination, and 3 corresponds to source and destination. There are, therefore, sixteen possibilities.

The blitter 72 also has several comparator control bits. Setting CMPPLN enables plane mode where the three comparator functions operate on the plane number bits as opposed to the entire pixel. Setting the CMPEQ bit causes the comparator to inhibit an inner loop write, if in plane mode the priority of the destination pixel is equal to the plane priority of the source pixel, or if the entire pixel is the same if not in plane mode. Setting the CMPNE bit causes the comparator to inhibit an inner loop write, if in plane mode the priority of the destination pixel is not equal to the plane priority of the source pixel, or if the entire pixel is not the same if not in plane mode. Setting the CMPGT bit only operates in plane mode, and causes the comparator to inhibit the write if the plane priority of the destination pixel is greater than the plane priority of the source pixel. Setting the CMPBIT gives a bit to byte expansion scheme. It causes the comparator to generate an inhibit by selecting a bit of the source data register using an inner counter, and generating an inhibit if the bit selected is a zero. The selection is given by 8 in the inner counter selecting bit 0, 7 selecting bit 1, 6 bit 2, and so on.

The program address register points to the source of blitting operation commands. Data is read from it sequentially upwards through memory. It must always be even (i.e., blitter operations must lie on word boundaries). Register 0 corresponds to address bits 0 through 15 and register 1 to address bits 16 through 23 and bits 0 through 7.

Some of the above blitter registers are visible in the I/O space of the CPU 48. In addition, some blitter status and control bits are accessible to the CPU 48. As mentioned above, the blitter 72 has 7 word-wide read registers and 4 word-wide write registers. Any unused bits in the write register should be written with a 0. The I/O registers appear starting from I/O address 40H. These registers are also available in the memory map, principally so the DSP 61 can access them, starting at the same offsets as I/O, but at base address F10400H (i.e., subtract 40H and add F10400H to get the memory address). The first blitter destination register corresponds to bits 0 through 15 of the destination address register. Bits 0 through 7 of the second blitter destination register correspond to bits 16 through 23 of the destination address register. And bit 15 of the second blitter destination register corresponds to the destination address nibble part of the destination address register. The first blitter source register corresponds to the bits 0 through 15 of the source address register. Bits 0 through 7 of the second blitter source register correspond to bits 16 through 23 of the source address register and bit 15 of the second blitter source register correspond to the source address nibble part. Bits 0 through 9 of the blitter inner counter correspond to the inner counter value. Bits 0 through 9 of the blitter outer counter correspond to the outer counter value. The blitter status register gives a variety of blitter status information. Bit 0 indicates that the comparator plane priority greater than condition is met. Bit 1 indicates that the comparator plane priority equal condition is met. Bit 2 indicates that the comparator plane priority not equal condition is met. Bit 3 indicates that the comparator pixel equal condition is met. Bit 4 indicates that the comparator pixel not equal condition is met. Bit 5 indicates that the comparator bit to pixel condition is met. Bit 13 corresponds to the run bit stating that the blitter is currently active, or operation is suspended by a CPU interrupt or a collision stop. Bit 14 indicates that the blitter has stopped for a CPU interrupt. Bit 15 indicates that the blitter has stopped because of a collision detection. The blitter program address register is loaded with bits 0 through 15 of the blitter program address. Recall that bit 0 of the register is always 0 because blitter programs must lie on word boundaries. The second blitter program address register is loaded with bits 16 through 23 of the blitter program address in bits 0 through 7. The other 8 bits are 0. The blitter command register corresponds to word 0 of the blitter command, and is used to set up the command when the blitter is started. Blitter DMA will then start from word one of the command.

The blitter control register has three bits: bit 0 which is an interrupt stop mask masks interrupts from the blitter's bus control unit when set, with a result that the blitter will not stop when an interrupt occurs, bit 1 causes the blitter to resume operation after a collision and is used to restart the blitter after a collision has been detected. Recall that a collision is detected when the COLST bit is set. The blitter will resume the operation which it has suspended. Note that it is possible to reprogram the blitter command register while the blitter is in the collision stop state, so the COLST bit among others may be changed, and bit 2 resets the blitter to a quiescent state after collision and is used to abort the operation the blitter was performing when a collision stop has occurred. Note that after a blitter collision stop occurs, either a resume or a reset should be issued to the blitter. The blitter 72 also has three rotate registers. Bits 0 through 3 correspond to the top four bits of the integer part of the X address, the bottom six bits of the 10-bit value are the integer part of the red value. Bits 4 through 7 correspond to the top four bits of the integer part of the X increment, the bottom six bits of this ten-bit value are the integer part are the red integer value. Bits 8 through 11 correspond to the top four bits of the integer part of the X step, the bottom six bits of this ten-bit value are the integer part are the red integer value. With the second rotate register bits 0 through 3 correspond to the top four bits of the integer part of the Y address, the bottom six bits of this ten-bit value are the integer part are the green integer value. Bits 4 through 7 correspond to the top four bits of the integer part of the Y increment, the bottom six bits of the ten-bit value are the integer part of the green integer value. Bits 8 through 11 correspond to the top 4 bits of the integer part of the Y step, the bottom six bits of the ten-bit value are the integer part are the green integer value. In the third rotate register setting bit 0 causes the rotate address to replace the destination. Setting bit 1 causes the rotate address to replace the source address. Setting bit 2 sets rotation mode, as opposed to shading mode. And bits 10 through 15 correspond to the top bits of the rotate address.

The DSP 61 audio coprocessor is a general purpose arithmetic coprocessor with sufficient power to implement a high performance music synthesizer. Synchronous serial outputs are provided for a generation of stereo audio signals with 16 bit precision, giving a sound quality normally associated with compact disc technology. The DSP 61 is micro-programmable from the host CPU 48 and the instruction set is sufficiently flexible to enable the user to program the device to fulfill many different functions that are quite different from that of "music synthesizer." Such applications might include algorithmic speech generation, audio analysis using fast Fourier transform techniques, and three-dimensional graphics rotations. The DSP 61 uses Harvard architecture (separate program and data buses) for maximum data throughput. The DSP 61 has an arithmetic logic unit (ALU).

The ALU features a hardware 16-bit by 16-bit hardware multiply/accumulate as well as addition, subtraction, and logical functions. There is also a separate serial divide unit, which generates one quotient bit per tick. The carry bit from the adder/subtracter is stored in a separate latch and can be either used to propagate carry for multiple precision arithmetic operations or can be used for conditional instructions. All instructions may be made to be dependent on this bit being set. Data transfers within the device are all 16 bits wide, with the exception of internal transactions within the multiplier/accumulator.

The DSP 61 is a very simple, very fast processor intended primarily for sound synthesis, but also capable of other computational tasks as noted above. It executes all instructions in one processor cycle; these instructions are executed at the system clock speed (typically 20 to 33 megahertz). During sound synthesis, the DSP 61 has its timing controlled by timers in an audio digital-to-analog converter (DAC) interface. These DACs are double-buffered, and if a DAC write is about to cause overflow, then operation is suspended until the buffer is empty. So long as the software to executes loops at sample rate, and as long as the average loop time is less than the sample period, then occasional loops can be up to twice as long. Because the loop may contain more instructions than will fit in the program RAM, the DSP 61 has an indexed addressing mode, which allows the same piece of code to act on several voices.

The DSP 61 is a Harvard Architecture device, thus the program RAM and the data RAM are separate, with cycles occurring in both RAM blocks at the same time. A one-cycle pipeline is used; therefore, during each clock cycle two events occur: an instruction is fetched, and the data transfer associated with the previous instruction takes place. This has the odd effect that an instruction after a jump is executed. The DSP 61 has two arithmetic logic units (ALUs, not shown): a typical ALU and a multiply/accumulate ALU; several registers: an X operand register, a second operand register, an AZ register, which holds the result from the ALU, and an MZ register, which holds the result from the multiply/accumulate register. The DSP 61 also has a DMA channel and a divider.

Operation of the DSP 61 is fairly simple. In the first tick of an execution of an instruction, the opcode is read from the program RAM into the instruction decoder. In the second tick, while the next instruction is read from the program RAM, a data transfer is performed either from system memory 45 to a register or a register to system memory 45, as per the first instruction.

The ALU within the DSP 61 is a 16-bit arithmetic logic unit, with the same functions as a Texas Instruments 74181, which is well known in the art. Common arithmetic operations are encoded as instructions; uncommon instructions may be performed by directly setting up the ALU mode bits with the general purpose arithmetic instruction (GAI).

The DSP 61 also has a multiplier/accumulator, which is a second ALU to perform 16 by 16 signed/unsigned multiplies to yield a 32 bit result. In addition to this, it may also perform multiply/accumulate operations, where the product of the multiply is added to the previous result. A result is accumulated to 36 bits to allow for overflow. Multiplier operations actually take two ticks, although the multiplying instruction itself completes in one tick. This means that the instruction following a multiply or a multiply accumulate may not involve the MZ register or the X register.

The DSP 61 also has a divider. The division unit appears as a set of registers in the internal DSP 61 space. It is capable of unsigned division on 16 or 32-bit operands, and produces a quotient and a remainder.

The DSP 61 also has a DMA channel. The DMA channel appears as a set of registers in the DSP 61 data memory space. These are two address registers and a data register. A DMA transfer is initiated by writing an address to the first of the two address registers. DMA transfers have a latency period, which must be allowed to elapse before performing further DMA. The DMA state machine is responsible for requesting the SYSTEM' bus, and when it is granted, performing the transfer, after which the SYSTEM' bus is released.

In the alternative, a word may be written to the second of the two address registers with a hold bit set. This will request the SYSTEM' bus and retain it until the hold bit is cleared. Such a DMA transfer may be efficient when performing successive multiple transfers, but is generally less efficient for single transfers because the DSP 61 program cannot determine when the SYSTEM' bus is granted, and therefore has to wait the maximum possible latency. DSP 61 memory is generally visible in both the DSP's internal data address base and in the host address base.

The DSP 61 has a DSP memory 76 associated with it. The DSP memory 76 comprises program RAM, data RAM, a register/constant table, and a sine ROM (all not shown). The DSP memory 76 in general is accessible in both the DSP's internal address space as well as the address space of the system memory 45. The DSP program RAM is 512 18-bit words. These locations may only be written by the CPU 48, and are program read-only as far as the DSP 61 is concerned. Program RAM does not appear in the DSP internal address space. The program RAM is not accessible to the host when the DSP 61 is running. Each DSP instruction has a 7-bit opcode and an 11-bit address vector. All microcoded instructions (with the exception of multiply or multiply/accumulate operations) are completed in 185 nanosecond cycle. All instructions are system memory 45 to register transfers or register to register transfers; immediate values are not allowed. Thus, if a constant is needed for a given instruction, it is not available in the constant table, a data RAM location must be set aside for the value. The DSP 61 also allows conditional instructions and indexed addressing. If bit 12 of the instruction code is set, then the instruction is executed only if the carry bit in the ALU is also set. If bit 11 in the instruction code is set, then the 9-bit address vector in the instruction code is added to the 9-bit value in the index register to produce the address and data memory operated on by the instruction. The extra two bits are programmed by loading the values into an extra bits register then writing the word into the desired location.

The DSP 61 has numerous move commands, which move data from and to memory and registers. Several other commands are available, including adding, subtracting, ANDing, ORing, adding with carry, a NOP, the GAI described above, and an INTRUDE command, which allows the DSP memory 76 to be accessed by the CPU 48.

The sine ROM is 256 16-bit words of full sine wave two's complement sine wave values.

The data RAM is 512 16-bit words.

Data may be transferred between the CPU 48 and the DSP 61 either under control of the DSP 61 or under the control of the host CPU 48.

The DMA transfer mechanism is based upon the DSP 61 becoming the bus master on the SYSTEM' bus and accessing the system memory 45. The DSP 61 is one of the highest priority bus masters, and will therefore be granted the SYSTEM' bus by the current bus master as soon as the current bus master is able to give up the SYSTEM' bus. The worst case for giving up the SYSTEM' bus is the situation where the CPU 48 is the bus master, because the 80376 or 80386SX processor can take a considerable amount of time to release the SYSTEM' bus. DMA transfers are started by a write to the first DMA address register, as stated above. Transfer of status information and the high part of the address should already have been written to the second DMA address register; similarly write data should already have been written to the DMA data register in the case of write transfers. When a transfer is initiated, the DSP 61 requests the SYSTEM' bus and when the SYSTEM' bus is granted to the DSP 61, the DSP 61 performs the transfer and then releases the SYSTEM' bus. Completion of this operation may be polled or the programmer may choose to allow the maximum possible latency to elapse before using read data and/or initiating another transfer.

A second bus acquisition technique may be performed which uses the hold bit in the second of the two DMA address registers to request the SYSTEM' bus. This may be more efficient if the DSP 61 wishes to perform multiple transfers consecutively, because the SYSTEM' bus is not released between transfers. The hold bit in the second DMA address register must be cleared before the DSP 61 will release the SYSTEM' bus. This mechanism is generally not recommended because the DSP 61 will have control of the SYSTEM' bus for significant periods of time without any activity, which is wasteful of overall memory bus bandwidth and could potentially disturb CD DMA transfers. If using the second technique, the DSP 61 must first request the SYSTEM' bus before performing any DMA transfer. It has no means of detecting that it has gained the SYSTEM' bus, and must therefore wait the maximum number of bus instructions. Once the DSP 61 has acquired ownership of the SYSTEM' bus it may then proceed to perform bus cycles. It may perform an arbitrary sequence of read and/or write cycles and should relinquish control of the SYSTEM' bus at the end of these.

Data transfer may also be performed between the CPU 48 and the DSP 61 under host CPU 48 control. All the internal memory of the DSP 61 is mapped into the host address space. When the DSP 61 is in stop mode, the host may write program memory locations just as if they were in normal system memory 45. When the DSP 61 is running, however, the program memory is not available to the host. DSP 61 data memory is only available by the INTRUDE mechanism. To ensure that DSP 61 operations are not disturbed in any way, data transactions can only take place in the data when the DSP 61 is executing INTRUDE instructions. When the DSP 61 is stopped, it may be considered to be effectively executing INTRUDE instructions constantly.

CPU 48 to DSP program RAM 76 transfers may be performed using the blitter 72 only while the DSP 61 is not running. Likewise, the blitter 72 cannot access DSP data RAM while the DSP 61 is executing. In short, both the blitter 72 and the CPU 48 may modify DSP program RAM 76 only while the DSP 61 executes an INTRUDE instruction.

The DSP 61 can cause the blitter 72 to perform very fast block moves of DSP code from system RAM to DSP program RAM. Thus, the DSP 61 and blitter 72 can team up to effectively provide the DSP 61 with more program RAM than is actually available.

The DSP 61 also has a serial audio digital-to-analog convertor (DAC) interface. The serial DAC interface allows the DSP 61 to both drive a synchronous serial ($I^2S$ or similar) DAC, and to input data from a synchronous serial data source such as a CD drive. The interface timing can be internally generated if no input device is attached, but if a data source is present, then it must be used to determine the timing. An internal overflow detector prevents the DSP 61 from writing to the DAC before the previous output data has been fully output. This is governed by write to the first of two DAC registers. Therefore, DAC transfers should take the form: write to the first DAC register, write to the second DAC register, read input values. These should be performed in close succession (less than 16 instructions). There is no detection of underflow, and should this occur, then the previous output value will be output again. The DAC values are doubled buffered, so that although audio code should loop at an average rate less than or equal to the sample period, it is possible for occasional passes through the loop to take up to two sample periods. This may be useful for exception processing.

The DSP 61 contains an arithmetic logic unit (ALU) compatible with the Texas Instruments 74181 device.

The video processor 39 also has a compact disc DMA controller 74. This CD controller contains the following functional blocks: A simple synchronous serial interface (for $I^2S$ and similar), a CD ROM block decoder and a DMA channel. The mechanism allows a serial data stream to be transferred to system memory 45, either directly, or by first passing through a block decoder. This allows an external block decoder to be used, in case of problems or incapabilities in the internal one. An interrupt can be generated when a transfer completes, given the transfer length counter reaching zero.

The compact disc controller synchronous serial interface supports the Philips data format, which is well known in the art. The Philips data format has a clock, a word select, line and a data line. The word select leads the data by one tick of the clock, and the data is aligned against the most significant bit (MSB) of a 32-bit datum. A low on the word select line indicates left data and a high on the word select line indicates right data. The synchronous serial interface also supports the Philips block decoder output formula. The bit ordering is reversed, and the first bit is aligned against the first bit of the datum. The word select format can be either the Philips data format, the Sony data format, or the Matsushita data format.

The CD drive controller 74 also has a block decoder. The block decoder synchronizes to the start of the 2352-byte sectors, performs the descrambling, and computes the EDC (error detection code) to detect errors. It operates in either short mode where a 2048 data bytes are transferred after the header, or a long mode, where the 2340 bytes after the sync pattern are transferred. This allows the header and error correction data to be read if desired. The header size is either programmable to either 4 or 12 bytes to support CD drive mode 1 and CDI/XA mode 2 form 1, but header matching is only performed on the main 4-byte header. The mode 2 forms are only supported by operating in long mode and extracting the required data. Header matching is performed on the first sector of the transfer to ensure that the correct data is being read. The desired header value should be programmed into the header registers. If a multisector transfer is performed, then no further matching occurs after the first sector.

Typically, normal transfers are performed in short mode, with the long mode being used when an error has been detected, so that the operating software can attempt to correct it. Multiple sector transfers are supported by giving a count of the total number of long words to be transferred. Errors will abort multiple sector transfers. Errors can take the following forms: unreliable data, EDC error, and no sync. It is possible to poll the decoder to determine its current status. The CD drive controller also has a DMA interface. The DMA interface can transfer to 2 16 bit words at a time into system memory 45. It can take either the output from the internal block decoder or the output from the synchronous serial interface. It has an address counter that runs upwards through system memory 45. The DMA interface has a transfer length counter for direct transfer from the serial interface. In "forever mode" the DMA address register wraps within a 32 kilobyte buffer, and a counter is ignored. This may be useful for CD audio data, or for real time and data handling such as "full-motion video" decompression. A CPU 48 interrupt is generated every time the address pointer wraps around the buffer.

Similarly, the present invention contemplates that many of the characteristics heretofore offered in set top devices used as accessories to television receivers may be incorporated directly into which are here called intelligent television receivers. One such intelligent television receiver is illustrated in FIG. 6 and identified there by reference character 10'. The circuitry described above with reference to FIGS. 3 through 5 will be incorporated within the housing or cabinet 11' of the intelligent receiver 10', in order that the receiver may respond to and cooperate with a remote control 20 as herein described. Inasmuch as such circuitry has been described in detail hereinabove, such description will not here be repeated.

Similarly, the present invention contemplates that the benefits of these inventions may be gained through use of personal computer systems. One such personal computer system is illustrated in FIG. 7.

Figure 7:
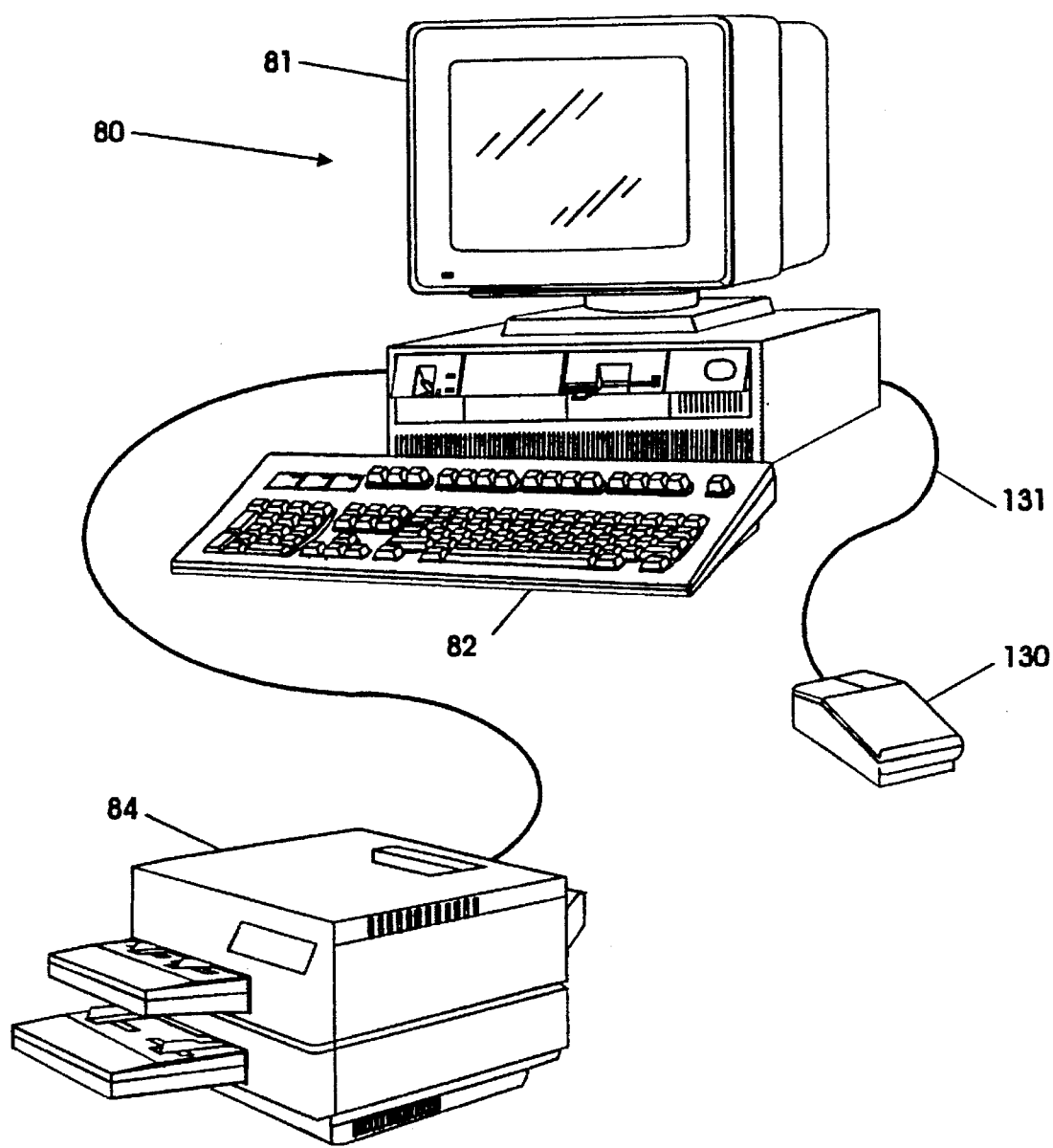
FIG. 7 is a perspective view of another embodiment of the present invention which includes a personal computer system and accessory input/output devices.
Figure 8:
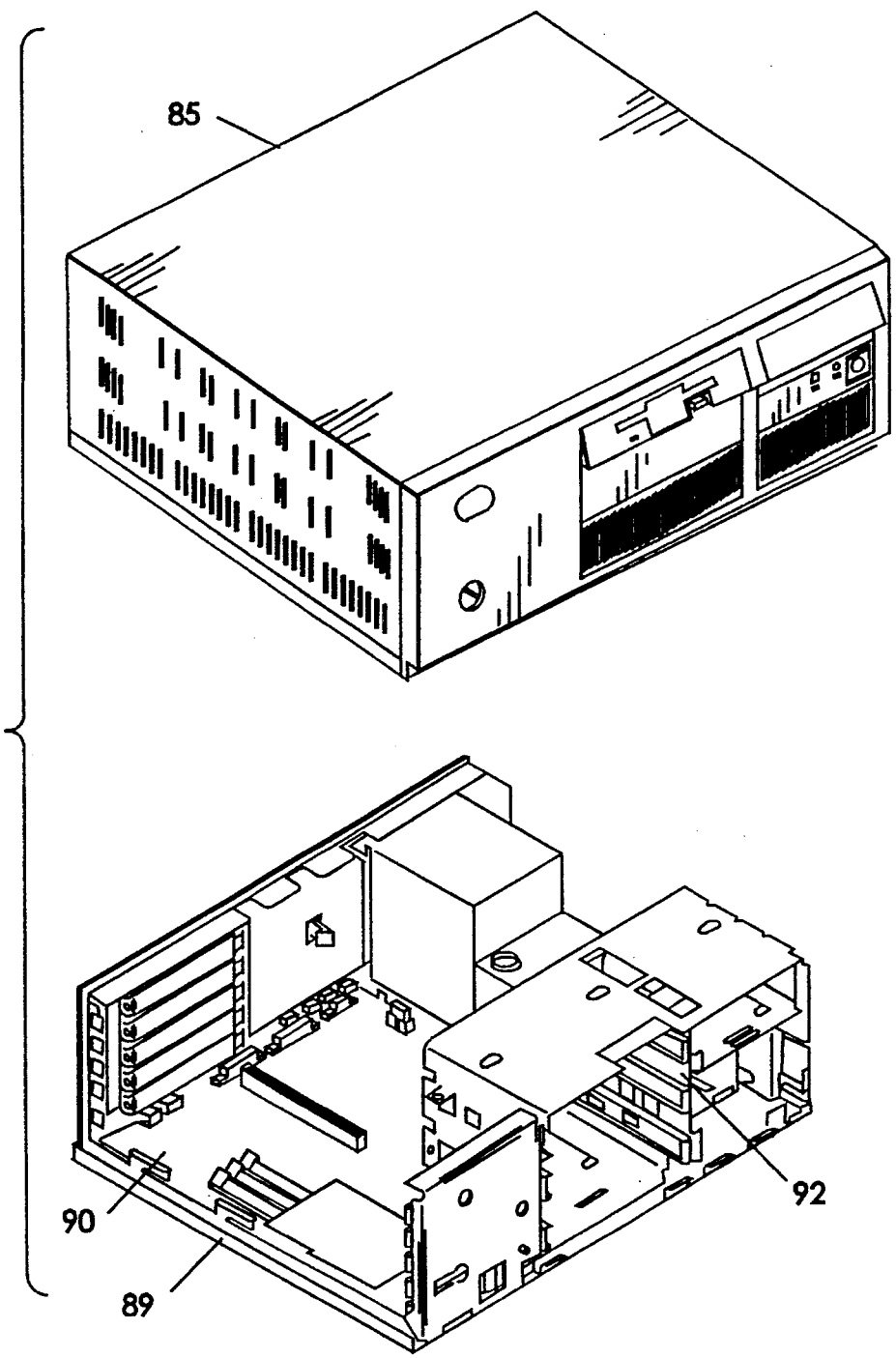
FIG. 8 is an exploded perspective view of certain elements of the personal computer system of FIG. 7.
Figure 9:
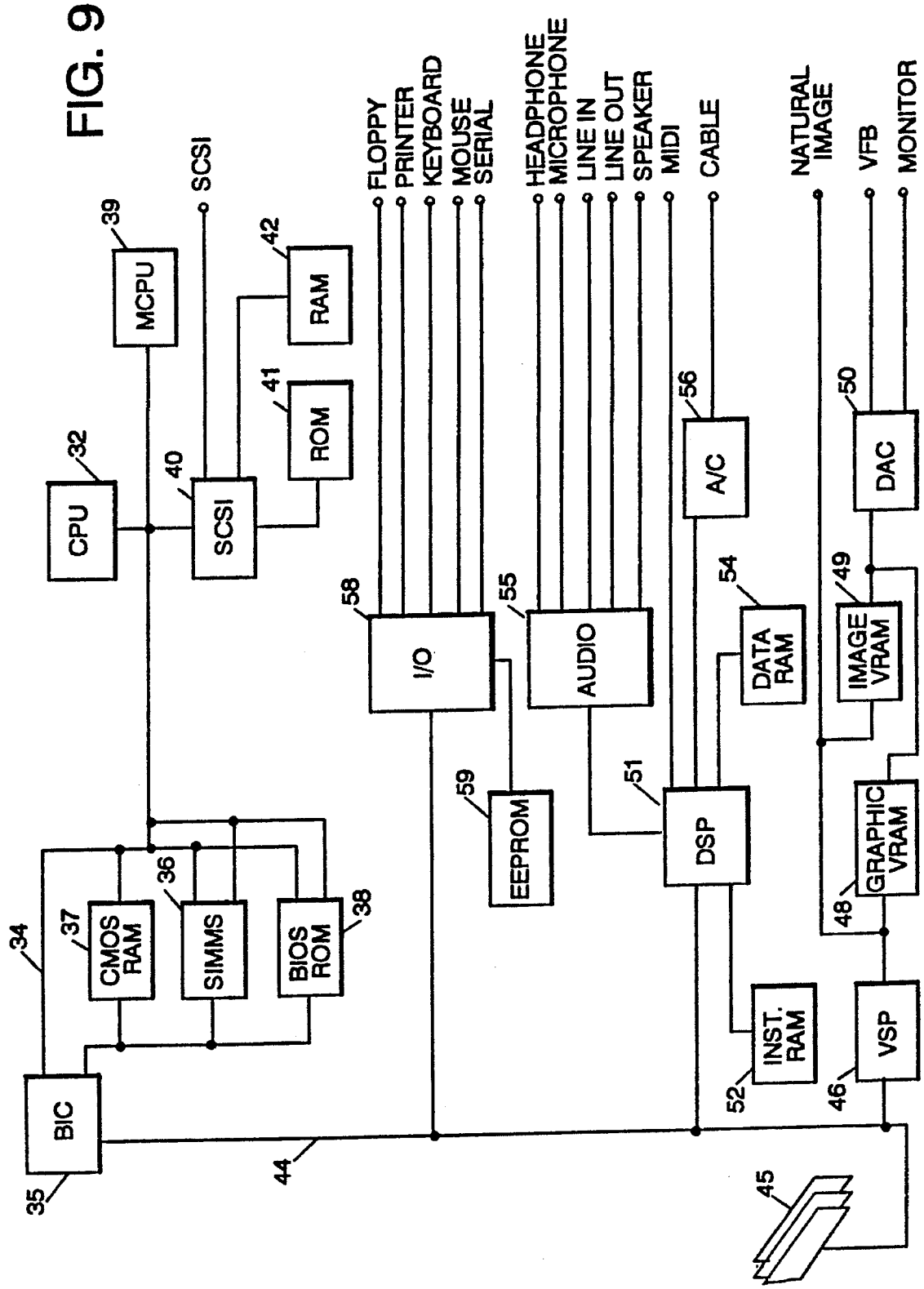
FIG. 9 is a schematic block diagram view of certain elements of the personal computer system of FIG. 8.

Referring now more particularly to FIGS. 7 through 9 of the accompanying drawings, a personal computer system embodying the present invention is there shown and generally indicated at 80 (FIG. 7). The computer 80 may have an associated monitor 81, keyboard 82 and printer or plotter 84. The monitor 81 functions as the display device in displaying to a human observer visual images derived from viso data, in similarity to the CRT 12, 12' of the television receivers illustrated in FIGS. 1 and 6. The computer 80 has a cover 85 which cooperates with a chassis 89 in defining an enclosed, shielded volume for receiving electrically powered data processing and storage components for processing and storing digital data, as shown in FIG. 8. At least certain of these components are mounted on a multilayer planar 90 or motherboard which is mounted on the chassis 89 and provides a means for electrically interconnecting the components of the computer 80 including those identified above and such other associated elements as floppy disk drives, various forms of direct access storage devices, accessory cards or boards, and the like.

The chassis 89 has a base and a rear panel (FIG. 8) and defines at least one open bay for receiving a data storage device such as a disk drive for magnetic or optical disks, a tape backup drive, or the like. In the illustrated form, an upper bay 92 is adapted to receive peripheral drives of a first size (such as those known as 3.5 inch drives). A floppy disk drive, a removable media direct access storage device capable of receiving a diskette inserted thereinto and using the diskette to receive, store and deliver data as is generally known, may be provided in the upper bay 92.

Prior to relating the above structure to the present invention, a summary of the operation in general of the personal computer system 80 may merit review. Referring to FIG. 9, there is shown a block diagram of a personal computer system illustrating the various components of the computer system such as the system 80 in accordance with the present invention, including components mounted on the planar 90 and the connection of the planar to the I/O slots and other hardware of the personal computer system. Connected to the planar is the system processor 102. While any appropriate microprocessor can be used as the CPU 102, one suitable microprocessor is the 80386 which is sold by INTEL. The CPU 102 is connected by a high speed CPU local bus 104 to a bus interface control unit 105, to volatile random access memory (RAM) 106 here shown as Single Inline Memory Modules (SIMMs) and to BIOS ROM 108 in which is stored instructions for basic input/output operations to the CPU 102. The BIOS ROM 108 includes the BIOS that is used to interface between the I/O devices and the operating system of the microprocessor 102. Instructions stored in ROM 108 can be copied into RAM 106 to decrease the execution time of BIOS.

While the present invention is described hereinafter with particular reference to the system block diagram of FIG. 9, it is to be understood at the outset of the description which follows that it is contemplated that the apparatus and methods in accordance with the present invention may be used with other hardware configurations of the planar board. For example, the system processor could be an Intel 80376 or 80486 microprocessor. Returning now to FIG. 9, the CPU local bus 104 (comprising data, address and control components) also provides for the connection of the microprocessor 102 with a math coprocessor 109 and a Small Computer Systems Interface (SCSI) controller 110. The SCSI controller 110 may, as is known to persons skilled in the arts of computer design and operation, be connected or connectable with Read Only Memory (ROM) 111, RAM 112, and suitable external devices of a variety of types as facilitated by the I/O connection indicated to the right in the Figure. The SCSI controller 110 functions as a storage controller in controlling storage memory devices such as fixed or removable media electromagnetic storage devices (also known as hard and floppy disk drives), electro-optical, tape and other storage devices.

The bus interface controller (BIC) 105 couples the OPU local bus 104 with an I/O bus 114. By means of the bus 114, the BIC 105 is coupled with an optional feature bus such as an Industry Standard Architecture (ISA), MICRO CHANNEL, EISA, PCI, or other bus having a plurality of I/O slots for receiving adapter cards 115 which may be further connected to an I/O device or memory (not shown). The I/O bus 114 includes address, data, and control components.

Coupled along the I/O bus 114 are a variety of I/O components such as a video signal processor 116 which is associated with video RAM (VRAM) for storing graphic information (indicated at 118) and for storing image information (indicated at 119). Video signals exchanged with the processor 116 may be passed through a Digital to Analog Converter (DAC) 120 to a monitor or other display device. Provision is also made for connecting the VSP 116 directly with what is here referred to as a natural image input/output, which may take the form of a video recorder/player, camera, etc. The VSP may take the form of the video processor 39 and associated circuitry described above with reference to FIGS. 3 through 5, in which event the CPU 102 may function, as to video control, similarly to the CPU 48 described above.

The I/O bus 114 is also coupled with a Digital Signal Processor (DSP) 121 which has associated instruction RAM 122 and data RAM 124 available to store software instructions for the processing of signals by the DSP 121 and data involved in such processing. The DSP 1 21 provides for processing of audio inputs and outputs by the provision of an audio controller 125, and for handling of other signals by provision of an analog interface controller 126.

Lastly, the I/O bus 114 is coupled with a input/output controller 128 with associated Electrical Erasable Programmable Read Only Memory (EEPROM) 129 by which inputs and outputs are exchanged with conventional peripherals including floppy disk drives, a printer 84, keyboard 82, a mouse or pointing device including a remote control such as the device 20, and by means of a serial port. In the form illustrated in the Figures here under discussion, the pointing device is in the form of a mouse 130 joined to the computer system by an elongate flexible conductor 131.

In all instances, a personal computer system practicing these inventions will have a remote control device. In such systems, "remote" control is characterized by the remote control device being usable at some distance of separation from an associated video display device. That distance of separation may be quite small, on the scale of inches, or comparatively larger, on the scale of feet, meters, yards or more, as will become more clear from the description which follows. The remote control device may be wire coupled (as a conventional mouse or keyboard) or wireless.

As discussed hereinabove, the remote control device may be a three axis device or, in some instances, a two axis device. The two devices are distinct and noninterchangeable, as will become clear from the discussion which follows. A "three axis" device, as the terminology is here used, is one in which a human user may manipulate a control element in three dimensions to effect the generation of control signals which will be effective to direct modification of visual images displayed on the associated video display device. A "two axis" device permits manipulation in only two dimensions.

A three axis device permits a type of operation which has been described as "press to select". That is, manipulation of the control element may direct movement of a selection display element, such as a cursor, from side-to-side and up-and-down through the field of a displayed visual image and then be used to also make a selection of a display feature. Side-to-side movement may, for example, be coupled to thumb pressure to one side or the other; up-and-down, to pressure away from or toward the manipulator. Selection, then would be coupled to thumb pressure along the third axis, as by pressing downwardly against the control element. An early example may be found in the disclosure of Garrett U.S. Pat. No. 5,065,146, issued 12 Nov. 1991 and held in common with the inventions here described.

A two axis device, in contrast, typically provides a separate control element for selection. Examples may be found in a conventional personal computer pointing device such as those known as a mouse, and in conventional remote controls as typically provided with such consumer electronic devices as television receivers, video cassette recorders, audio amplifiers, compact disk players, video disc players, and the like. In both instances, one control element (a rolling ball in the case of the mouse and up-down or right-left rocker switches or stepping keys in the case of the conventional remote control) may direct movement of a selection display element, such as a highlighted band, across a displayed video image, and then a second control element (in the case of a mouse, a button; a conventional remote control, a push switch) is manipulated to make a selection of a display feature.

The two types of remote control devices are other than interchangeable.

Either of the two types of remote control devices is contemplated by these inventions as being capable of transmitting command signals coordinated in a predetermined manner to manipulation of the control element(s) by the human observer. Either may be coupled to the display controller to transmit at a frequency which is outside direct sensing by the human observer in a variety of ways, including radiation of light at frequencies not visible to a human observer (infrared or ultraviolet), or radio frequencies. Either may be tethered, or coupled by a flexible conductor as is commonly the case with a personal computer pointing device.

The control element(s) manipulable by a human user are contemplated as being in a variety of forms. One, described hereinabove, may be known as a "wiggle stick", and takes the form of a elongate element standing upright for engagement with a user's thumb. Another may be a "wobble plate", a somewhat flat and planar or shallowly dished member, typically round in configuration, mounted to pivot relatively freely about a central point, typically maintained in a neutral position by a resilient bias such as a spring, and which can be depressed by a user's thumb in any one of at least four selected directions. Yet another may be a trackball, which is somewhat similar to an inverted personal computer system mouse, in that a freely rotatable element or ball is provided and supported in a manner that enables signals to be generated indicating rotation of the ball in its mount. And still yet another may be an inertial or "air" mouse. Such a device typically has an inertial platform and sensors capable of generating signals indicating displacement of the mouse in space.

This invention contemplates that control programs (including operating system and application programs) will be stored in the system RAM 45 or flash ROM 49 and executed in the display controller. In accordance with this invention, such control programs make use of a particularly compact programming language now to be described. The language and programming to be described are particularly useful in limiting the amount of memory which must be provided in a consumer product, where the costs of such memory is an important factor in selling price. However, it is to be understood that less compact programming languages, and thus control programs, may be useful where the expense of additional memory capability (up to and including inclusion of a hardfile of fixed disk direct access storage device) can be borne.

The computing system disclosed herein is "open", i.e. a system that will run future applications which are not currently defined. The system has limited storage for applications. It is therefore important to minimize the size of the applications that run on the system, so they can reside in a small amount of storage.

Two tasks may inflate the size of application software. One is the User interface (herein identified as UI). This part of the software drives hardware which interacts with the user, such as a display, a speaker, a keyboard, or a mouse. The other is the External interface (herein identified as EI), the system's access to information from its own storage and information from other systems. This part of the software drives hardware such as a disk drive or a modem.

Figure 10:
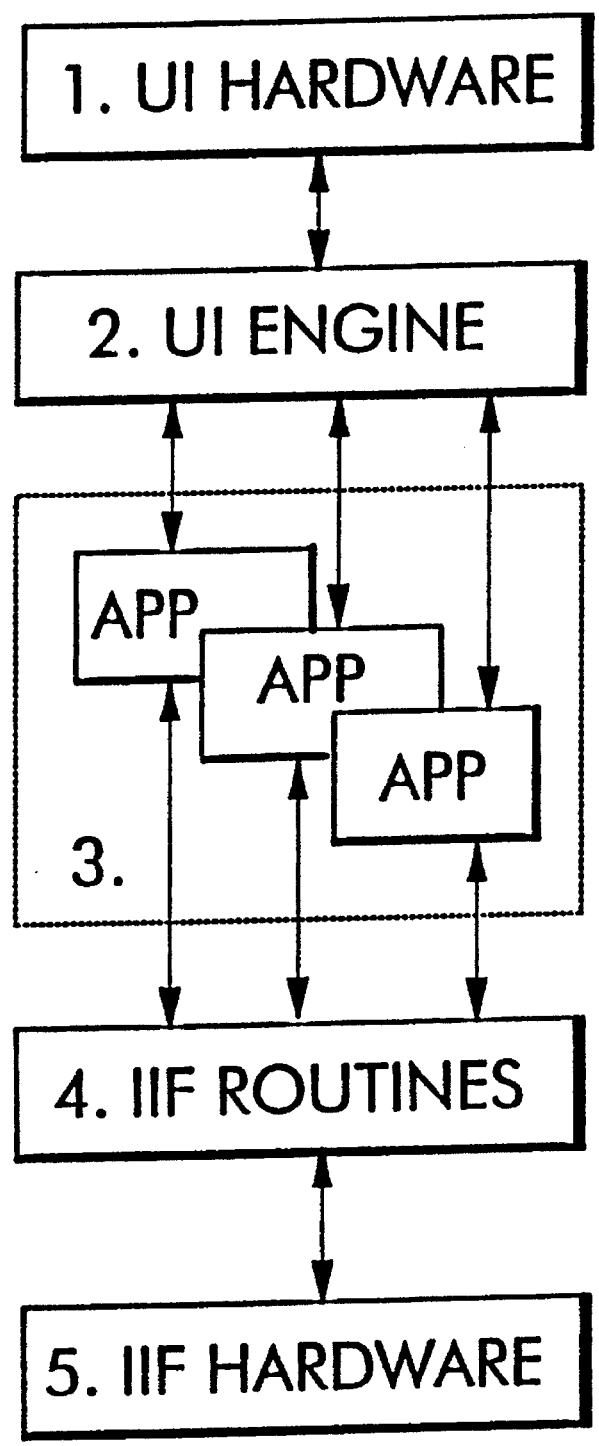
FIG. 10 is an illustration of the structure of a control program functioning with the systems of FIGS. 1 through 9 in accordance with this invention.

The first step in reducing the size of application program data is to remove from the applications the software for the user interface and the external interface. The present invention contemplates that the software for these two tasks is built into the system, not the applications. Referring to FIG. 10:

Box 1 The user interface (UI) hardware (display, keyboard, etc.) is shown at the top of the figure.

Box 2 The UI Engine is permanent software in system ROM which handles the user interface. For instance, the UI Engine (box 2) would display information on the screen (part of box 1) at the request of an application (in box 3). Sound, keyboard activity, and other user input/output would be handled by the UI Engine. Note the arrows indicating that the UI Engine interacts with both the UI hardware and the applications. One objective achieved by this invention is to make the UI Engine small so that it requires less system ROM.

Box 3 The gray box in the middle of the figure indicates application program data storage. The applications are stored in system RAM (readable and writable), so that an application can be added, removed, or modified. One objective achieved by this invention is to make the applications small so that more applications can fit in a given storage space. In FIG. 10, the size of the applications is potentially reduced because the user interface and the information interface are handled outside of the applications.

Box 4 The EI Routines are also permanent software in system ROM; these routines handle the external interface hardware. For example, an EI Routine would dial a phone number on the modem at the request of an application. (Some of the EI Routines are in RAM instead of ROM, so that additional hardware support can be added in the future.)

Box 5 The external interface (EI) hardware (disk drive, modem, etc.) is shown at the bottom of the figure.

This arrangement finds some parallels in other computer systems. For example, the DOS operating system makes file input/output functions global to all applications; these are EI Routines. The Microsoft Windows environment provides a common UI for all applications. However, the primary goal of these systems is to make applications conform to standards, not to save space.

The present invention provides a user interface that is based on "levels". At a given level, the user views information and makes a selection. The selection may cause a new level to be created below the current level, or the selection may cause the current level to be destroyed, returning to a previous level. As here used, the word "level" may refer to a menu or flow instruction.

Figures 11, 12:
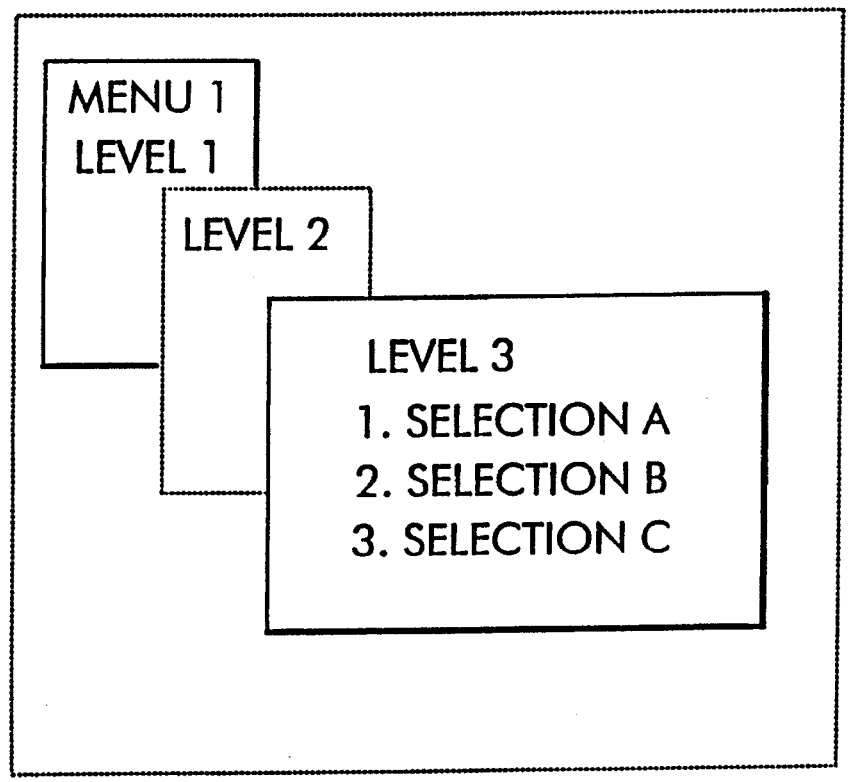
FIG. 11 is an illustration of the coding of a control program constructed using the structure shown in FIG. 10; and Each of FIG. 12 through FIG. 18 is a view of the display screen of a television receiver of FIGS. 1 or 6 or personal computer system of FIG. 7 operating in accordance with this invention.

In a preferred embodiment, each menu level in the user interface is represented by a graphic and text display similar to a paper index card drawn on the screen. The pieces of paper ("menu cards") are cascaded on the screen, as illustrated in FIG. 12. As there illustrated, the user is currently at menu card 2 (Level 3). Moving to menu card 2 has involved the sequence illustrated by Figures 11 and 12. From the display of a full motion video image as received from a video/audio stream source such as broadcast television, a user may cause a first level of menu to appear in overlay over the video stream image by actuation of the selection feature provided on the remote control 20. The application begins by displaying Card1. The title of the Card is "Menu 1" and the selectable items are "Weather" (Selection A) and "Sports" (Selection B). If "Weather" is selected, it creates Card2, since this is the action in the "Selection A" line. Card2 is a flow card which immediately displays Card3 since the condition "1==1" is true. Thereafter, the user may manipulate the cursor 135 (FIGS. 13 through 18) or pointer to be positioned over an indicated item, such as item 1 for "Weather", and again actuate the selection feature of the remote control 20. Thereupon the user interface will respond by creating the next level, Level 2 ("flow"), as illustrated in phantom lines in FIG. 12. A return to the video/audio stream image alone can be effected by positioning the cursor/pointer in the field of the image and actuating the selection feature or stepwise by first returning to menu level 1 by positioning the cursor over the heading "Information Highway" and actuating the selection feature of the remote control.

This is a simple example of the user interface; a typical situation is much more complex. For instance, some menu cards only present information, and do not allow any action except exiting to the previous level after viewing the information. Other menu cards allow the selection of a combination of items. The user interface supports these and other types of menus. Any menu can have more than one page (as indicated by a "turn the page" symbol at the lower right hand corner of a menu card); turning a page does not imply moving to a different level.

In a UI Engine in accordance with this invention and based on levels, each level is either a menu object or a flow object. These two types of objects are called "cards" in a preferred embodiment:

1. A "menu card" implements a UI level. For instance, each of the two "pieces of paper" in FIG. 12 is a menu card.
2. A "flow card" implements a routine in a programming language. This type of card does not appear on a display screen as a UI level, and is hence invisible to the user (one is indicated by phantom lines in FIG. 12 for purposes of illustration only). While a menu card presents a list of actions to the user, a flow card processes a list of actions with a "flow of control" determined by branches, loops, etc.

Each of these cards can launch a card of either type. A menu can launch another menu or a flow in response to a user selection. A flow can launch another flow or a menu. Furthermore, each type of card can invoke an EI Routine when it needs to use the external interface hardware. Each card can also invoke another UI Engine application; this transition is seamless to the user since the sequence of levels is not interrupted.

To illustrate these points, consider an example from the preferred embodiment of the language. FIG. 11 shows the beginning of a sample application.

Each line in the language consists of two parts:

1. A "description", the text before the encircled A or "at" symbol ("@").
2. An "action", the text beginning with the encircled A ("@").

Each card begins with a title line, such as "Level 1 @Card1 menu". The description part of this line is the title of the card; the action is the card's label. Each card ends with a line containing only "@". Hence, three cards are shown in the example in FIG. 12.

FIG. 12 shows the three cards. Card2 is a flow card which is invisible to the user. Only Card1 and Card3 are displayed.

Though the two card types are similar, there are some important differences. The following table shows the symmetry between menus and flows.

| Menu | Flow |
|---|---|
| Menu cards are visible to the user. | Flow cards are invisible to the user. |
| The user looks at the descriptions and selects an action. | The system looks at the descriptions and selects an action |
| If a line has no "@", then the | If a line has no "@", then the |

| Menu | Flow |
| --- | --- |
| entire line is taken as a description and there is no action. This is because an action with no description is meaningless in a menu. Descriptions determine how the text appears on the screen: its position, color, etc. | entire line is taken as an action and there is no description. This is because a description with no action is meaningless in a flow. Descriptions determine the flow of control in a programming language with branches, loops, etc. |

When allocating resources such as variables and file streams, it is useful to designate each resource with a level. The resource is automatically deallocated when its level is destroyed. For example, when a variable is created in the language, it is assigned a level. The variable is global to all levels, i.e. a card can send information to another card by putting it in a variable. However, the variable is destroyed when the level inside the UI Engine goes below the level of the variable. In other words, when the card where the variable was created is destroyed, the variable is destroyed with it. The variable "goes out of scope" when its level is destroyed. This is how the language handles all resources that can be allocated to cards.

The present invention provides solutions to three problems. First, the size of the applications is dramatically reduced. Observe from the example in FIG. 11 that the sample application is stripped down to bare essentials. Most of the content of the application is text rather than programming. The text can be compressed to less than half its original size by using standard compression techniques. The size of the programming can be reduced by compilation; however, this will not be necessary if a compression algorithm used for the text is adapted to also compress the programming. The resulting application approaches the theoretical minimum size, which is the size of its compressed text. Next, the size of the UI Engine is reduced. Observe that menu cards and flow cards have identical syntax. Both types of cards are made up of lines that have descriptions and actions. The actions which a menu can perform are the same as the actions which a flow can perform. (The only exception is that a flow allows actions which jump around in the flow, while these actions are meaningless in a menu.) Variable resolution and other parsing operations are the same for both types of cards. Thus, the same software in the UI Engine processes both menu cards and flow cards. Last, the UI Engine running this language can be ported to any operating environment that is based on menu levels. This is because the language limits user input and output to a hierarchy of levels. The same applications could run in a variety of different environments.

Menu systems are commonly implemented with the "menu" type of objects. For example, the Microsoft Windows Software Development Kit includes a "Dialog Box Editor" which constructs the levels of the Windows menus. An object at each level can create an object at the next level, similar to one menu creating another.

Also, programming languages commonly use the "flow" type of object. For instance, objects in the C++ language can create instances of other objects, similar to one flow creating another.

The uniqueness of the programming language here described is the way it mixes the two types of objects in a single unified language.

Turning now to the range of menu construction and display capabilities envisioned for the systems described to this point in the present specification, it is contemplated that the command processor circuitry described hereinabove respond to manipulation of the remote control 20 by enabling the human observer to move a cursor image 135 displayed over a video image to a menu item and select for execution a menu item overlain by the cursor image. Further, in a manner similar to the "drag and drop" functionality of certain personal computer system software, the command processor circuitry responds to manipulation of said remote control device by enabling the human observer to move a cursor image to a menu item, select for displacement a menu item overlain by the cursor image, and move a selected menu item across the visual image displayed by the visual display device. To aid in a user distinguishing the differing characteristics of portions of the display field, the cursor image signal may change the visual characteristic of the displayed cursor as manipulation of the input devices causes the displayed cursor to be moved to different areas of displayed visual images, as by making the cursor larger when over certain fields of the display.

Figure 13:
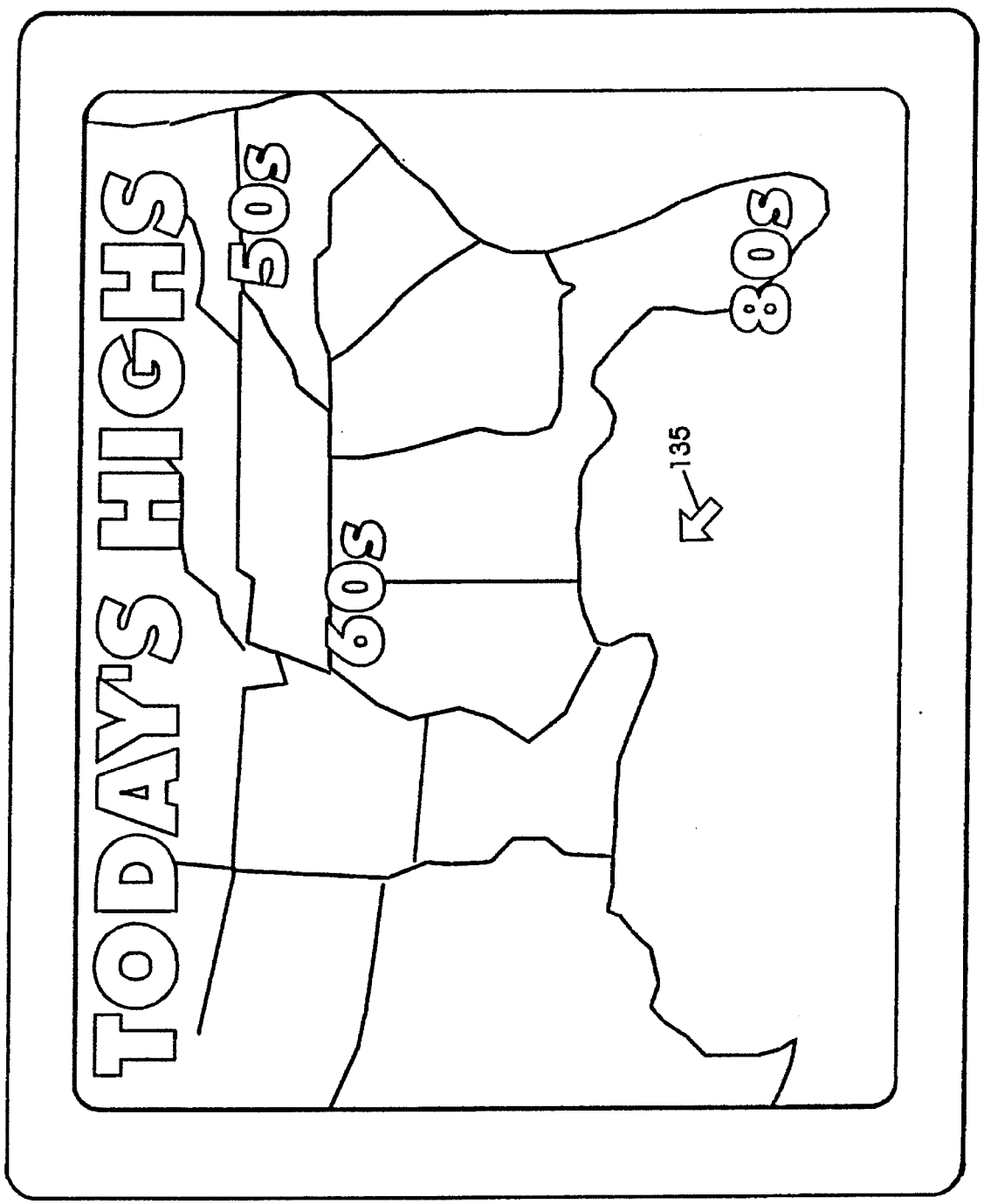
Figure 14:
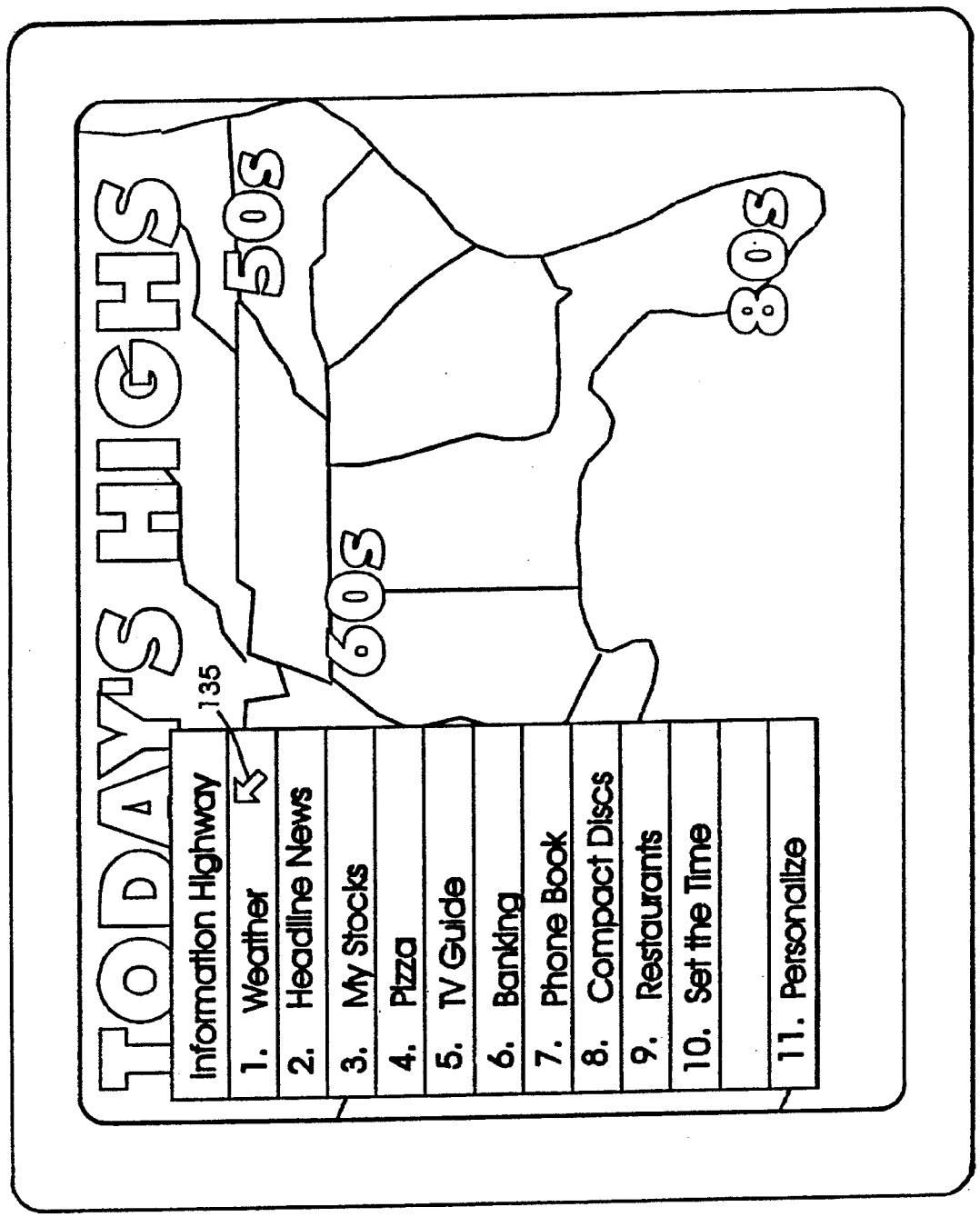
Figure 15:
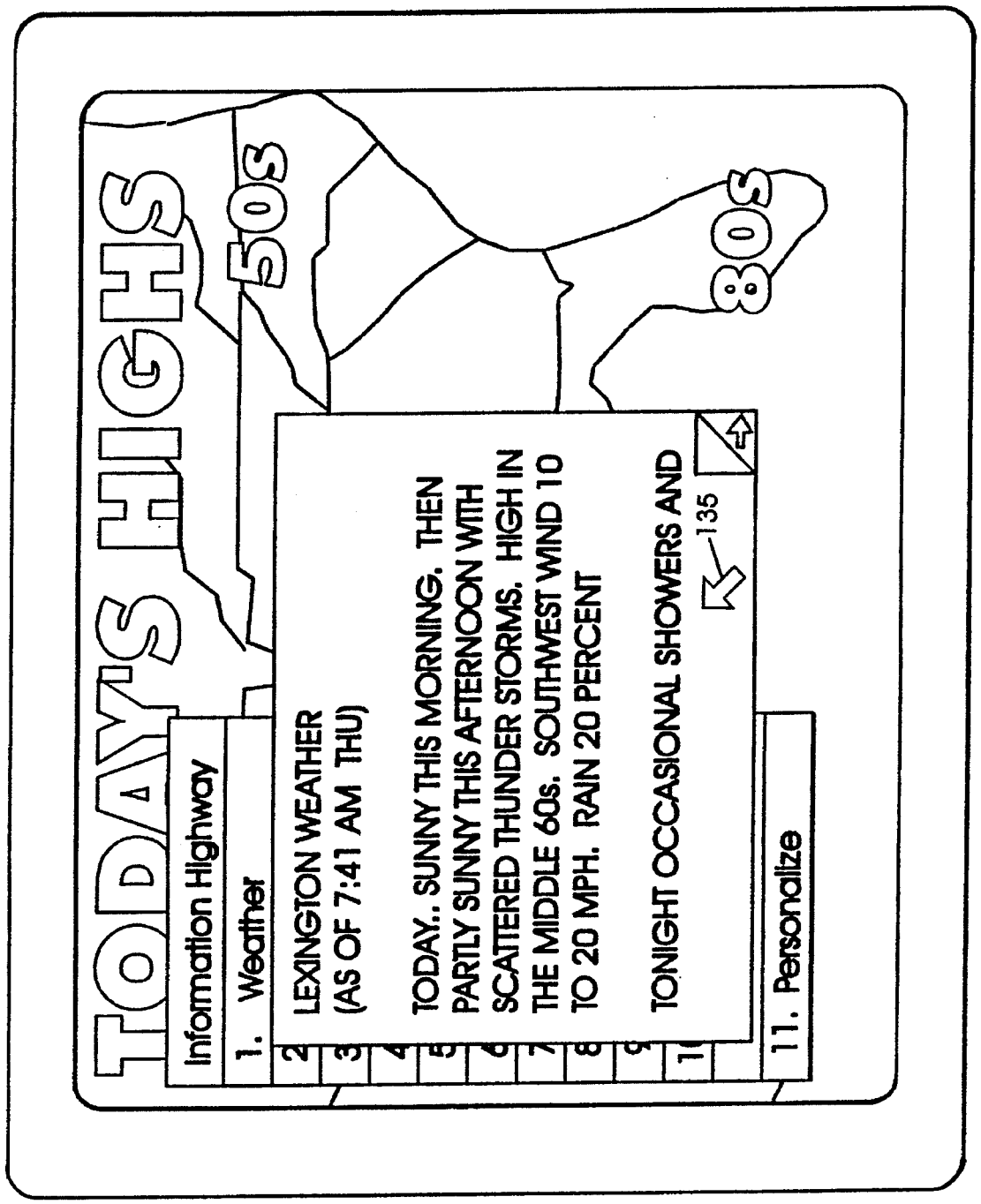

As illustrated in FIGS. 13 through 15, the display controller modifies displayed visual images by displaying over a portion of a live video images a menu display from which the human observer may select further modifications of said visual images. Thus, in FIG. 13, a major portion of the available field is occupied by the video stream image (the image of a weather map, partially obscured in FIGS. 14 and 15 by the overlain menus and informational text) while a minor portion is occupied by the displayed menu(s). The menus offered may include, as in FIG. 14, a pull down menu display in which possible further modifications of the visual images and/or accessible information displays are displayed as tiled windows or as overlain windows or as cascaded windows. Certain of the accessible information choices, such as item 4 "Pizza", preferably provide access to remote services such as ordering take out food by means of the back channel communication such as a modem incorporated in the system. Others, such as item 1 "Weather" will access information available from a data service such as local weather observations (as illustrated in FIG. 15). Still others, such as item 5 "TV Guide" may lead to the selection of programming for viewing.

Figure 16:
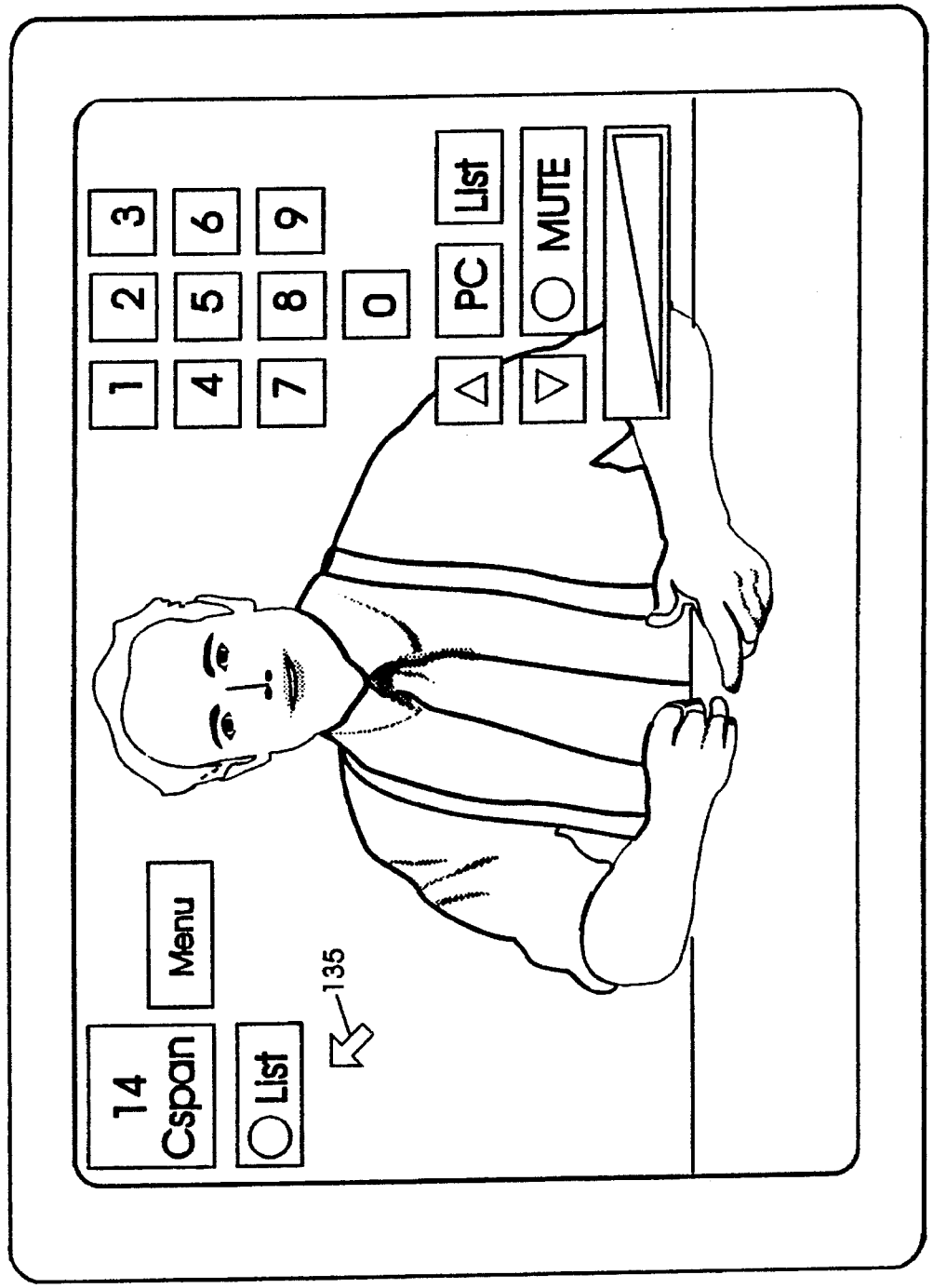
Figure 17:
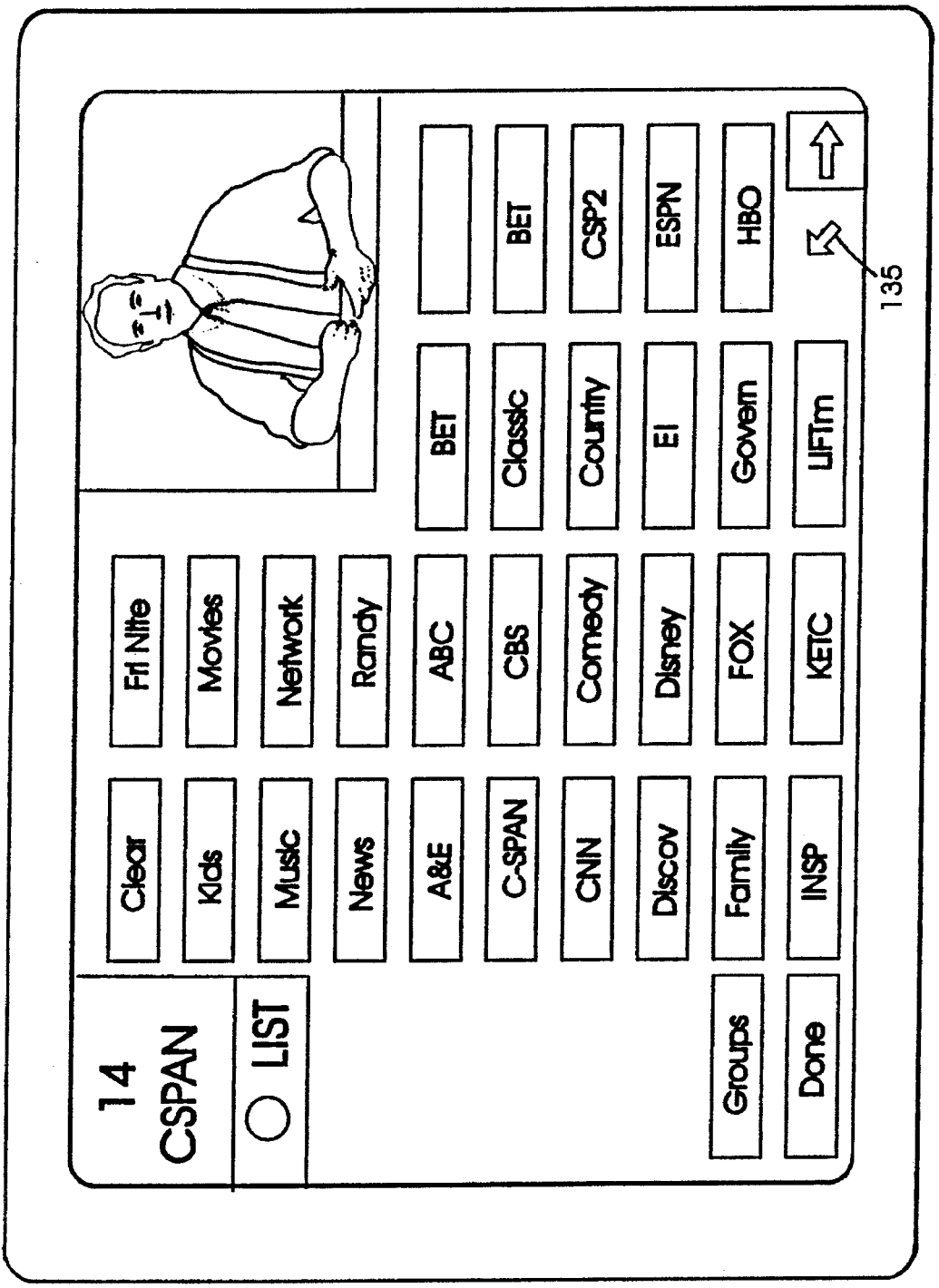
Figure 18:
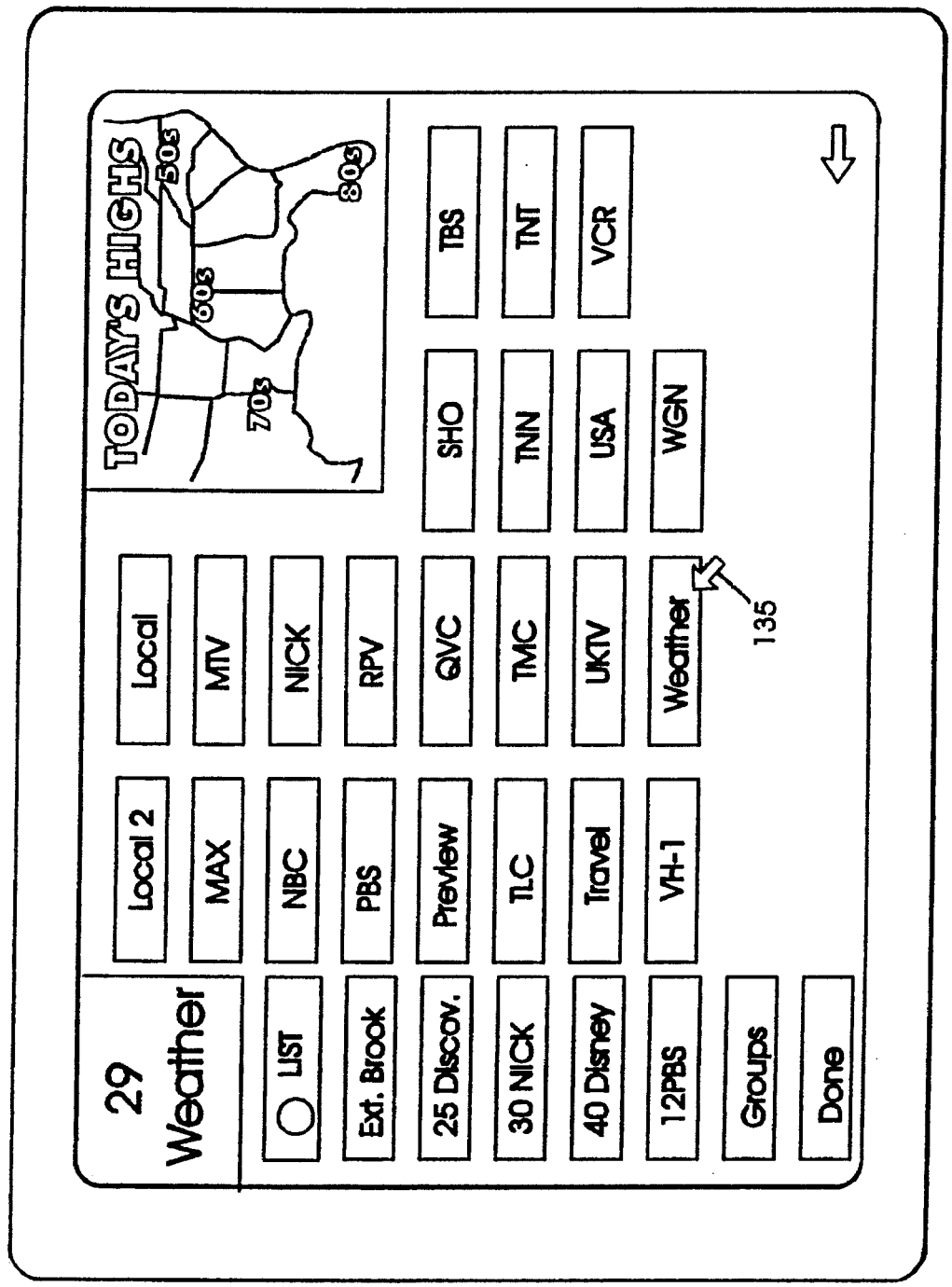

The display controller may also modify displayed visual images by displaying the video stream image as a minor portion of the available field. Access to such a display is illustrated by the sequence of FIGS. 16 through 18. As indicated in the right hand portion of FIG. 16 (where menu selection elements are display as overlain onto a video stream image), the menu display may mimic functional controls provided as remote control functions in prior television receivers or video cassette recorder/players. Selection of the remote control functions enables use of the embodied icons such as the iconic representations of "channel up" or "channel down" found in remote control functionality for navigation among programming choices. However, by selecting "List" or "Menu", other services may be accessed. From the screen of FIG. 16, selecting "Menu" will take an observer to the screen of FIG. 17, where the video stream images is displayed in a minor portion of the available screen area (the upper right hand corner) almost as if it were a so-called "picture in picture", with the remainder of the viewing field being occupied by listing of available choices. A list of desired viewing options can be created by selecting the function "List" to add the currently viewed signal stream, then progressively selecting and adding other choices to the list. When viewed channels or signal sources are thus constructed into a list, the list may be named (such as "Fri Night" for favorite programs viewed that evening or "Kids" for programming specifically selected by or for children) and saved in system memory. Thereafter, the previously viewed and assembled list may be recalled for ready "channel surfing" among the preselected range of programming. When creation of a list is completed, the function "Done" may be selected to end the process.

In the drawings and specifications there has been set forth a preferred embodiment of the invention and, although specific terms are used, the description thus given uses terminology in a generic and descriptive sense only and not for purposes of limitation.

What is claimed is:

1. A combination comprising: a television receiver having:

a video display device having a predetermined screen area for displaying visual images to a human observer; and video reception circuitry coupled to said video display device for receiving signals transmitted at frequencies which are outside direct sensing by the human observer and for delivering to said video display device video signals which drive said video display device to display said visual images; a remote control device usable at some distance of separation from said television receiver and having:

a housing sized to be held in the hand of the human observer;

a manually engageable input device mounted in said housing for manipulation by the human observer; and control transmitter circuitry mounted in said housing and coupled to said input device for transmitting at a frequency which is outside direct sensing by the human observer command signals coordinated in a predetermined manner to manipulation of said input device by the human observer; and a display controller having:

command receiver circuitry for receiving said command signals from said command transmitter circuitry and for deriving from said received command signals image directing signals directing modification of said visual images; and command processor circuitry coupled to said command receiver circuitry and to said video reception circuitry
   (a) for receiving said image directing signals,
   (b) for generating a cursor image signal for overlay of a cursor image onto said visual images, and
   (c) for displaying over a portion of said visual images a menu element display from which the human observer may select further modifications of said visual images as directed by manipulation of said remote control device by the human observer, said display Controller and Said remote control device cooperating for moving said cursor image across the area of said visual images and said menu display to position the cursor image onto a displayed element and for directing modification of said visual images in response to selection of a displayed element overlain by the cursor image, said display controller cooperating with the television video display device for displaying full motion video visual images occupying substantially the entirety of the screen area and a menu display occupying a minor portion of the screen area and overlying said full motion video visual images.

2. A combination according to claim 1 wherein said menu display mimics functional controls provided as remote control functions in prior television receivers.

3. A combination according to claim 1 wherein said menu display mimics functional controls provided as remote control functions in prior video cassette recorder/players.

4. A combination according to claim 1 wherein said menu display enables interactive modification of functions and functional controls by the human observer.

5. A combination according to claim 1 wherein said menu display embodies icons.

6. A combination according to claim 1 wherein said menu display embodies character strings.

7. A combination comprising:

a remote control device usable at some distance of separation from a television receiver which has a video display device having a predetermined screen area, the remote control device having:

a housing sized to be held in the hand of the human observer;

a manually engageable input device mounted in said housing for manipulation by the human observer; and control transmitter circuitry mounted in said housing and coupled to said input device for transmitting at a frequency which is outside direct sensing by the human observer command signals coordinated in a predetermined manner to manipulation of said input device by the human observer; and a display controller for coupling to a television receiver video display device and for delivering to a coupled television receiver video display device image directing signals, said display controller having:

command receiver circuitry for receiving said command signals from said command transmitter circuitry and for deriving from said received command signals image directing signals directing modification of visual images displayed to a human observer by the television receiver video display device; and command processor circuitry coupled to said command receiver circuitry and to the television receiver video display device
   (a) for receiving said image directing signals,
   (b) for generating a cursor image signal for overlay of a cursor image onto said visual images, and
   (c) for displaying over a portion of said visual images a menu element display from which the human observer may select further modifications of said visual images as directed by manipulation of said remote control device by the human observer, said display controller and said remote control device cooperating for moving said cursor image across the area of said visual images and said menu display to position the cursor image over a displayed element and for directing modification of said visual images in response to selection of a displayed element overlain by the cursor image, said display controller cooperating with the television video display device for displaying full motion video visual images occupying substantially the entirety of the screen area and a menu display occupying a minor portion of the screen area and overlying said full motion video visual images.

8. A combination according to claim 7 wherein said menu display mimics functional controls provided as remote control functions in prior television receivers.

9. A combination according to claim 7 wherein said menu display mimics functional controls provided as remote control functions in prior video cassette recorder/players.

10. A combination according to claim 7 wherein said menu display enables interactive modification of functions and functional controls by the human observer.

11. A combination according to claim 7 wherein said menu display embodies icons.

12. A combination according to claim 7 wherein said menu display embodies character strings.

13. An intelligent television receiver comprising:
- a remote control device usable at some distance of separation from said television receiver and having:
  - a housing sized to be held in the hand of the human observer;
  - a manually engageable input device mounted in said housing for manipulation by the human observer; and
  - control transmitter circuitry mounted in said housing and coupled to said input device for transmitting at a frequency which is outside direct sensing by the human observer command signals coordinated in a predetermined manner to manipulation of said input device by the human observer;
- a video display device having a predetermined screen area for displaying visual images to a human observer;
- video reception circuitry coupled to said video display device for receiving signals transmitted at frequencies which are outside direct sensing by the human observer and for delivering to said video display device video signals which drive said video display device to display said visual images;
- command receiver circuitry for receiving said command signals from said command transmitter circuitry and for deriving from said received command signals image directing signals directing modification of said visual images; and
- command processor circuitry coupled to said command receiver circuitry and to said video reception circuitry
  (a) for receiving said image directing signals,
  (b) for generating a cursor image signal for overlay of a cursor image onto said visual images, and
  (c) for displaying over a portion of said visual images a menu element display from which the human observer may select further modifications of said visual images as directed by manipulation of said remote control device by the human observer,
- said command processor circuitry and said command receiver circuitry and said remote control device cooperating for moving said cursor image across the area of said visual images and said menu element display to position the cursor image onto a displayed element and for directing modification of said visual images in response to selection of a displayed element overlain by the cursor image,
- said command processor circuitry and said video reception circuitry cooperating for displaying full motion video visual images occupying substantially the entirety of said screen area and a menu display occupying a minor portion of said screen area and overlying said full motion video visual images.

14. A television receiver according to claim 13 wherein said menu display mimics functional controls provided as remote control functions in prior television receivers.

15. A television receiver according to claim 13 wherein said menu display mimics functional controls provided as remote control functions in prior video cassette recorder/players.

16. A television receiver according to claim 13 wherein said menu display enables interactive modification of functions and functional controls by the human observer.

17. A television receiver according to claim 13 wherein said menu display embodies icons.

18. A television receiver according to claim 13 wherein said menu display embodies character strings.

19. A method of displaying visual images to a human observer using a television video display device having a predetermined screen area for displaying visual images to a human observor comprising the steps of:
- receiving signals transmitted at frequencies which are outside direct sensing by the human observer;
- delivering, to said television video display device, video signals which drive the television video display device to display visual images;
- generating, with a manually engageable input device remote from the television video display device and manipulable by the human observer, command signals indicative of desired modifications of the displayed visual images and delivering generated signals to a command transmitter;
- transmitting, from the command transmitter and at a frequency which is outside direct sensing by the human observer, command signals coordinated in a predetermined manner to manipulation of the input device by the human observer;
- receiving the command signals from the command transmitter and deriving from the received command signals image directing signals directing modification of the visual images;
- generating a cursor image signal for overlay of a cursor image onto displayed visual images; and
  (a) receiving the image directing signals and cursor image signal and;
  (b) displaying full motion video visual images occupying substantially the entirety of said screen area and a menu display occupying a minor portion of said screen area and overlying said full motion video visual images, while
  (c) modifying the visual images as directed by manipulation of the remote control device by the human observer to (j) overlay the cursor image onto selected portions of displayed visual images and (ii) move the cursor image across the area of the visual images and the menu display and (iii) facilitate modification of the visual images by the human observor through selection of menu commands overlain by the cursor image.

20. A method according to claim 19 wherein said first mentioned signals carry analog information defining the visual images.

21. A method according to claim 19 wherein said first mentioned signals carry digitally coded information defining the visual images.

22. A method according to claim 19 wherein said first mentioned signals carry compressed digitally coded information defining the visual images.

23. A method according to claim 19 wherein said first mentioned signals are transmitted by broadcast transmission.

24. A method according to claim 19 wherein said first mentioned signals are transmitted by cable transmission.

25. A method according to claim 19 wherein said first mentioned signals are transmitted by satellite transmission.

26. A method according to claim 19 wherein said first mentioned signals are transmitted through a telecommunications network.

27. A method according to claim 19 wherein said first mentioned signals are derived as output from a video recording.

28. A method according to claim 27 wherein said first mentioned signals are derived as output from magnetic tape video recordings.

29. A method according to claim 27 wherein said first mentioned signals are derived as output from optical disk video recordings.

30. A method according to claim 19 further comprising the step of selecting between (a) delivering, as said received transmitted signals, signals received by transmission and (b) delivering, as said received transmitted signals, signals derived as output from a video recording and further comprising recording signals received as by transmission.

31. A method according to claim 19 wherein said step of generating command signals comprises manipulating a wiggle stick.

32. A method according to claim 19 wherein said step of generating command signals comprises manipulating a wobble plate.

33. A method according to claim 19 wherein said step of generating command signals comprises manipulating a track ball.

34. A method according to claim 19 wherein said step of generating command signals comprises manipulating an inertial mouse.

35. A method according to claim 19 wherein said step of transmitting command signals comprises transmitting command signals by infrared radiation.

36. A method according to claim 19 wherein said step of transmitting command signals comprises transmitting command signals by ultrasound.

37. A method according to claim 19 wherein said step of transmitting command signals comprises transmitting command signals by radio frequency.

38. A method according to claim 19 wherein said step of transmitting command signals comprises transmitting command signals through an elongate flexible conductor.

39. A method according to claim 19 further comprises the step of communicating to a remote location, through a back channel communication device, commands originating from manipulation of the remote control device by the human observer.

40. A method according to claim 39 wherein said step of communicating through a back channel communication device comprises communicating through a telecommunication modem.

41. A method according to claim 39 wherein said step of communicating through a back channel communication device comprises communicating through a cable modem.

* * * * *